US012730978B1

(12) United States Patent
Knox et al.

(10) Patent No.: US 12,730,978 B1
(45) Date of Patent: Sep. 8, 2026

(54) DERIVING TEXT ELEMENTS FROM THREADED ELECTRONIC MESSAGES

(71) Applicant: GRAMMARLY, INC., San Francisco, CA (US)

(72) Inventors: Dru Knox, Oakland, CA (US); Dimitris Alikaniotis, New York, NY (US); Maxim Gubin, Danville, CA (US); Timo Mertens, San Francisco, CA (US); Spencer Herrick, San Francisco, CA (US); Roman Khlystik, San Francisco, CA (US)

(73) Assignee: Superhuman Platform Inc.

(*) Notice: Subject to any disclaimer, the term of this patent is extended or adjusted under 35 U.S.C. 154(b) by 382 days.

(21) Appl. No.: 18/343,380

(22) Filed: Jun. 28, 2023

Related U.S. Application Data

(60) Provisional application No. 63/356,893, filed on Jun. 29, 2022.

(51) Int. Cl.

| | |
|---|---|
| ***G06F 40/40*** | (2020.01) |
| ***G06F 40/295*** | (2020.01) |
| ***G06F 40/30*** | (2020.01) |
| ***G06Q 10/107*** | (2023.01) |

(52) U.S. Cl.
CPC ............ *G06F 40/40* (2020.01); *G06F 40/295* (2020.01); *G06F 40/30* (2020.01); *G06Q 10/107* (2013.01)

(58) Field of Classification Search
CPC ........ G06F 40/30; G06F 40/295; G06F 21/51; G06F 21/53; G06F 21/567; G06F 21/577; G06F 21/62; G06F 2221/034; G06F 2221/2119; G06F 16/951; G06F 16/9558; G06F 40/174; G06F 40/205;
(Continued)

(56) References Cited

U.S. PATENT DOCUMENTS

| | | | | |
|---|---|---|---|---|
| 9,449,080 | B1 * | 9/2016 | Zhang | G06F 16/3346 |
| 11,030,408 | B1 * | 6/2021 | Lewis Meza | G06F 40/253 |

(Continued)

FOREIGN PATENT DOCUMENTS

| | | | |
|---|---|---|---|
| KR | 20070093701 | A | 9/2007 |
| WO | 2001057723 | A2 | 8/2001 |
| WO | 2006060340 | A3 | 6/2006 |

*Primary Examiner* — Abdelali Serrou
(74) *Attorney, Agent, or Firm* — Van Hoven PC; Jordan Becker

(57) ABSTRACT

A computer-implemented process is programmed to programmatically receive, from a client device, digital electronic copies of two or more electronic messages that are associated with one another as a message group and directed to a receiving account, form an in-memory object model of the two or more electronic messages and the message group, evaluate the two or more electronic messages using one or more first machine learning models to output one or more derived message elements, the one or more derived message elements comprising at least a list of one or more first text elements of the two or more electronic messages that require one or more responses from the receiving account, and generate and transmit, to the client device, presentation instructions formatted for rendering at the client device and to cause displaying the one or more derived message elements in a graphical user interface of the client device.

21 Claims, 15 Drawing Sheets

(58) Field of Classification Search
CPC ............. G06F 18/214; G06F 18/24323; G06F 40/216; G06F 40/289
See application file for complete search history.

(56) References Cited

U.S. PATENT DOCUMENTS

| | | | | |
|---|---|---|---|---|
| 2013/0024525 | A1* | 1/2013 | Brady | G06F 40/174<br>709/206 |
| 2013/0318172 | A1* | 11/2013 | Liberty | G06Q 30/0241<br>709/206 |
| 2018/0032606 | A1* | 2/2018 | Tolman | G06F 16/93 |
| 2020/0409981 | A1* | 12/2020 | Kadatoka | G06F 40/284 |
| 2022/0254338 | A1 | 8/2022 | Gruber | |
| 2022/0351855 | A1* | 11/2022 | Ohiomoba | G06F 3/04842 |
| 2023/0094828 | A1* | 3/2023 | Ramsl | G10L 25/54<br>704/235 |
| 2023/0336515 | A1 | 10/2023 | Agrawal et al. | |

* cited by examiner

700
Gmail
Compose
Interior design consultation – Brooklyn Garcia
710
712
714
716
720
722
724
725
702
Check out the articles below!
Aurora Solar
Senior Product Designer
About the role:

700
Gmail
Compose
Interior design consultation – Brooklyn Garcia
Riley Poh
710
750
702
750

810
Gmail
Compose
Interior design consultation – Brooklyn Garcia
710
Content hidden
814
wework
BUILDING GUIDE
SUBMIT A TICKET
WeWork Weekly
812
New & Notable

DERIVING TEXT ELEMENTS FROM THREADED ELECTRONIC MESSAGES

BENEFIT CLAIM

This application claims the benefit under 35 U.S.C. 119(e) of provisional application 63/356,893, filed Jun. 29, 2022, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. @ 2022-2023 Grammarly, Inc.

TECHNICAL FIELD

One technical field of the present disclosure is computer-implemented natural language processing. Another technical field is natural language text summarization, addition, modification, or suggestion. The suggested CPC classification is G06F40/40 and G06N5/04.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

As communications increasingly take place through virtual means and with multiple parties through media such as e-mail, the average person may spend hours each day reading and replying to emails. Email is known to be the top source of information overload for professionals. For example, the average knowledge worker may spend up to two-and-a-half hours a day searching for information in their email inbox required for ramping up on projects. Time spent searching through inboxes, reading, and replying to emails is an inefficient use of time for employees and costly for employers. A substantial percentage of email sessions involve the user writing a reply. Emails that a user replies to account for half of all time spent on email. The average thread length on the first open is two to three messages, and when a user revisits a thread, on average there is one new message with the rest collapsed. Triage and skimming of emails are known as critical tasks for users, and reply assistance is unavailable or primitive.

Thus, there is an acute need in the relevant technical fields for a computer-implemented, high-speed online system capable of inspecting text in collaborative environments to identify key information, assist the user in determining relationships between concepts, and provide suggestions for the user to respond to inquiries with a single click. A significant user population is believed to need message augmentation, and there is an acute need to obtain quick signals concerning priority, topics covered, and follow-up items.

SUMMARY

The appended claims may serve as a summary of the invention.

BRIEF DESCRIPTION OF THE DRAWINGS

In the drawings:

Each of FIG. 2A.

FIG. 9 illustrates an example of transitions from the recap bar to other panels of information that can be programmed to display in response to selections of links or widgets within the recap bar.

DETAILED DESCRIPTION

Figure 1:
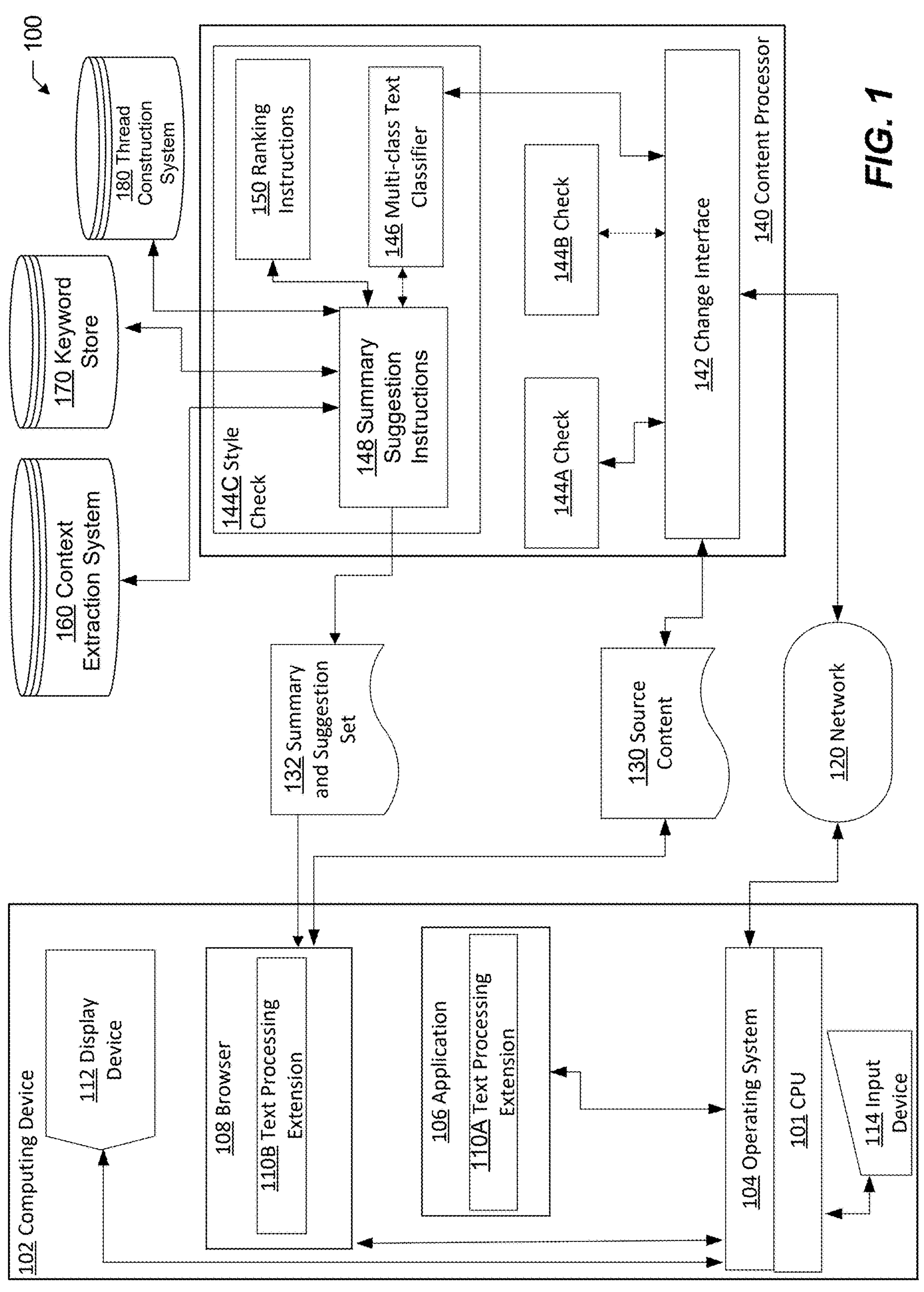
FIG. 1 illustrates a distributed computer system showing the context of use and principal functional elements with which one embodiment could be implemented.

In the following description, numerous specific details are explained to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail outlined in this disclosure is the same level of detail that persons of skill in the art normally use to communicate with one another to express algorithms to be programmed or the structure and function of programs to implement the inventions claimed herein.

Embodiments are described in the sections below according to the following outline:

1. General Overview
2. Structural & Functional Overview
   2.1 Context Extraction and Prediction
   2.2 Example Context Extraction System
   2.3 Example Graphical User Interface
3. Implementation Example—Hardware Overview

1. General Overview

In an embodiment, a computer-implemented process is programmed to process the context of email threads to identify the main points of the email, the main points of the email thread, summarize long paragraphs and display content to the user. As an example and not by way of limitation, the computer-implemented process may interoperate with a visual or graphical user interface that is programmed to enable users to review a summary of the email content, which allows users to digest content within the email thread without having to manually read the entire thread. Furthermore, embodiments may display sections of the email thread identified as needing a response and assist the user in drafting a response. Embodiments can offer support to users reading on different platforms like email, documents, and Web messaging systems so they can consume critical information quickly and accurately. In doing so, embodiments can establish relationships among consumed information so they can be accessed to support users on what to do, including writing, conversations, and meetings in a meaningful way.

Users are known to need summaries and follow-up assistance for emails in particular. In various embodiments, summaries can be provided at several levels of granularity. Examples of functions of embodiments include thread-level summaries, meta summaries, dive deeper summaries, comment-worthy summaries, follow-up rewrites, and enhanced email filtering. TABLE 1 compares the purpose and possible implementation of selected kinds of functions:

TABLE 1

SUMMARY PROCESSING FUNCTIONS

| Function | Description | User problem |
|---|---|---|
| Thread-Level Summaries | Ability to summarize an entire conversation thread, not just the individual messages | Helps users save time during triage or skimming by providing an even denser view of the message. Just read one summary instead of one per message. |
| Meta Summaries | Pithy one-sentence summaries to describe an entire email. | Similar benefits to thread-level: meta summaries are more condensed than bullet points. |
| Dive Deeper Summaries | Ability to pull specifically related information from an email when prompted with a bullet or topic | Relates to user comments around trust. Diving deeper improves our explainability by showing the important info that a bullet covers. It also allows us to have more compact summaries, because users can easily drill into more high-level bullet points to get additional details. |
| Comment-worthy Follow-Ups | Follow-ups generated from implied signals like tone or concerned language | Helps with the reply assistance use case, where a user wants to make sure they've replied to everything. Comment-worthy highlights things like confusion or concern so you can address those issues. |
| Follow-up Rewrites | Transform extracted follow-ups into impressive and portable to-do items | General quality improvement for follow-ups. Addresses common user feedback that follow-ups can seem "out of context" |
| Enhanced email filtering | Accurate detection of direct human messages compared to advertisements and automated emails | General quality improvement. |

In an embodiment, the disclosure provides a computer-implemented method comprising: receiving, from a client device, digital electronic copies of two or more electronic messages that are associated with one another as a message group and directed to a receiving account, forming an in-memory object model of the two or more electronic messages and the message group, evaluating the two or more electronic messages using one or more first trained machine learning models to output one or more derived message elements, the one or more derived message elements comprising at least a list of one or more first text elements of the two or more electronic messages that require one or more responses from the receiving account, and generating and transmitting, to the client device, presentation instructions that are formatted for rendering at the client device and to cause displaying the one or more derived message elements in a graphical user interface of the client device.

In some embodiments, two or more electronic messages are electronic mail messages that are related to one another as a message thread. In some embodiments, two or more electronic messages are displayed at the client device in an HTML document, the method further comprising obtaining access to a document object model (DOM) of the HTML document, detecting a change in the DOM that is associated with the client device expanding a text display of one or more of the two or more electronic messages, obtaining updated text of the two or more electronic messages from the DOM, and repeating the forming, evaluating, generating and transmitting based on the updated text.

In some embodiments, one or more derived message elements comprise one or more identifiers of named entities, persons, or accounts that are specified in the two or more electronic messages and/or the message group. In some embodiments, one or more derived message elements comprise at least a set of key takeaways from the two or more electronic messages and/or the message group. In some embodiments, one or more derived message elements comprise at least a summary of the two or more electronic messages and/or the message group.

In some embodiments, one or more derived message elements comprising at least a set of keywords from the two or more electronic messages and/or the message group, the presentation instructions being formatted to cause displaying, at the client device, each keyword in the set of keywords using a keyword hyperlink, each keyword hyperlink being formatted to cause, when selected, displaying one or more second text elements of the two or more electronic messages, the one or more second text elements being semantically related to the keyword of the keyword hyperlink.

In some embodiments, the computer-implemented method may further comprise receiving a changed text from the client device, the changed text comprising at least a portion of a third electronic message that is associated with the two or more electronic messages, evaluating the changed text using a second trained machine learning model to output a probability value specifying a probability that the changed text is a response to the one or more first text elements of the two or more electronic messages that require the one or more responses from the receiving account, and determining that the probability value is greater than a specified threshold value and, in response thereto, generating and transmitting, to the client device, updated presentation instructions that are formatted for rendering at the client device and to cause updating the graphical user interface of the client device to remove at least one of the derived message elements. In some embodiments, the computer-implemented method may comprise receiving, from the client device, a feedback input specifying an approval or disapproval of one or more derived message elements, and updating one or more machine learning models based on the feedback input.

In an embodiment, a computer-implemented process is programmed to execute signature detection to filter email signature content out of summaries and follow-ups. Without this filter, the system might suggest text like "follow me on Twitter" as a follow-up item.

One embodiment is programmed to assist in managing large-volume email in-boxes of knowledge workers. The embodiment can be programmed to:

1. Quickly understand what an email is about to decide if it needs attention [triage]. In an embodiment, at the top of every message, the process informs the user how many follow-ups are in the message and the user can easily see a list of actions needed to get a sense of the email's urgency. Inline highlights quickly draw the user's eye to the most important points, letting the user quickly determine what a message is about. For longer messages, the system provides a bulleted summary, which makes it easier to get an overview of the discussion in one place instead of piecing together highlights.
2. Pull out the most important points as quickly and efficiently as the user can [skimming]. Many email threads have useful information but don't need the user to read every detail. The user has to balance how much information the user can consume while still being able to get the job done. The system helps the user by highlighting the main points of each message in the thread as the user reads. It lets the user skip the pleasantries and get straight to the information. When the user hits longer messages that are hard to process just by looking at highlighted sentences, the user can open the summary and follow-up panels to see everything in one place, rewritten with more context so it reads naturally.
3. For important emails, the user wants to catch every detail and respond to everything [reply assistance]. While reading, the system reinforces all the important points and follow-ups making sure the user doesn't miss them. Once the user begins their reply, Reader is the user's heads-up display. It gives the user a handy list of questions and action items to address, and the user can remind the user of important points from messages without scrolling back and forth.

2. Structural & Functional Overview

FIG. 1 illustrates a distributed computer system 100 showing the context of use and principal functional elements with which one embodiment could be implemented. In an embodiment, computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1, computing device 102 is communicatively coupled via a network 120 to a content processor 140. In one embodiment, computing device 102 comprises a client-type computing device such as a personal computer, laptop computer, tablet computer, smartphone, or notebook computer. For purposes of illustrating a clear example, a single computing device 102, network 120, and content processor 140 are shown in FIG. 1, but practical embodiments may include thousands to millions of computing devices 102 distributed over a wide geographic area or over the globe, and hundreds to thousands of instances of content processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

In one embodiment, at runtime, one or more of application 106 and browser 108 loads, or are installed with, a text processing extension 110A and 110B, which comprises executable instructions that are compatible with content processor 140 and may implement application-specific communication protocols to rapidly communicate text commands and data between the respective extension and the text processor.

Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or to obtain input text is not critical provided that an extension is compatible with and can be functionally integrated with an application 106 or browser 108.

In some embodiments, the text processing extension 110A may install as a stand-alone application that communicates programmatically with either or both of the operating system 104 and with an application 106. For example, in one implementation, text processing extension 110A may execute independently of application 106 and programmatically calls services or APIs of operating system 104 to text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described in other sections herein.

In some embodiments, each text processing extension 110A, 110B may be linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B, to detect text that is entered in input fields or panels of application 106 or browser 108. For example, application 106 or browser 108 may instruct the application or browser to delete a character, word, sentence, or another unit of text, and instruct the application or browser to insert a character, word, sentence, or another unit of text.

Each of the text processing extensions 110A, 110B is programmed to interoperate with an application 106 or browser 108 to detect the entry of text in a text entry function of the application or browser and/or changes in the entered text, to transmit changes in the text to content processor 140 for server-side checking and processing, to receive responsive data and commands from the text processor, and to execute presentation functions in cooperation with the host application or browser.

As one functional example, assume that browser 108 renders an HTML document or email thread that includes a text entry panel in which a user can enter free-form text describing a product or service. The text processing extension 110B is programmed to detect user selection of the text entry panel, the entry of text, or changes in the text within the panel, and to transmit all such text changes to content processor 140. In an embodiment, each text processing extension 110A, 110B is programmed to buffer or accumulate text changes locally over a programmable period, for example, five seconds, and to transmit the accumulated changes over that period as a batch to content processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc.

Network 120 broadly represents one or more local area networks, wide area networks, campus networks, or internetworks in any combination, using any terrestrial or satellite, wired, or wireless network links.

In an embodiment, the content processor 140 comprises one or more server computers, workstations, computing clusters, and/or virtual machine processor instances, with or without network-attached storage or directly attached storage, located in any of enterprise premises, private data center, public data center and/or cloud computing center. Content processor 140 broadly represents a programmed server computer having processing throughput and storage capacity sufficient to communicate concurrently with thousands to millions of computing devices 102 associated with different users or accounts. Content processor 140 can be implemented using one or more virtual machine instances that provide a web application server, web applications, and supporting software that can interoperate with browser 108 and application 106 to provide the functions and services that are described herein.

For purposes of illustrating a clear example and focusing on innovations that are relevant to the appended claims, FIG. 1 omits basic hardware elements of content processor 140 such as a CPU, bus, I/O devices, main memory, and the like, illustrating instead an example software architecture for functional elements that execute on the hardware elements. Content processor 140 also may include foundational software elements not shown in FIG. 1, such as an operating system consisting of a kernel and primitive services, system services, a networking stack, an HTTP server, other presentation software, and other application software. Thus, content processor 140 may execute on a first computer, and text processing extensions 110A, 110B may execute on a second computer.

In an embodiment, content processor 140 comprises a change interface 142 that is coupled indirectly to network 120. Change interface 142 is programmed to receive the text changes that text processing extensions 110A, 110B transmit to content processor 140, and to distribute the text changes to a plurality of different checks 144A, 144B, 144C. To illustrate a clear example, source content 130 of FIG. 1 represents one or more text changes that text processing extension 110B transmits to change interface 142. In an embodiment, change interface 142 is programmed to distribute each and every text change arriving from a text processing extension 110A, 110B to all of the checks 144A, 144B, 144C, which execute in parallel and/or in independent threads.

Thus, in one embodiment, the content processor 140 may be programmed to programmatically receive a digital electronic object comprising a source text, a message with the source text, an electronic thread with the source text, an application protocol message with the source text, an HTTP POST request with the source text as a payload, or using other programmed mechanics. In one embodiment, each of the checks 144A, 144B, 144C may be programmed to execute a different form of checking or processing of the content that has arrived. Example functions that check 144A, 144B, and 144C may implement include grammar checking, tone detection, translation, expression determination, and content extraction. For example, dates, names, and job titles may be extracted by the content extraction system.

In an embodiment, check 144C is programmed as a style check, and therefore it is also denoted "style check 144" in this description. In an embodiment, the checks 144A, 144B, and 144C may comprise a multi-class text classifier coupled to summary suggestion instructions 148, which are coupled to ranking instructions 150; however, other machine learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by ML-based filtering.

Furthermore, style check 144C is coupled to or may access a keyword store 170, which may be integrated with content processor 140 or implemented as separate storage. In an embodiment, keyword store 170 comprises a database, flat file system, object store, or another digital data repository that stores a large number of textual phrase suggestions, in association with category values or tags that specify a category or type of communication, text, or document in which the suggestions could be substituted. For example, content processor 140 may identify keywords stored in keyword store 170, as well as update the keyword store 170 in real-time as electronic messages are received. Thus, check 144 and/or content processor 140 may be programmed for evaluating each particular source text unit among the plurality of source text units using a trained multi-class text classifier machine learning model and receiving a classification output from the multi-class text classifier that classifies each particular source text unit as a particular class of phrases and/or keywords among a plurality of possible classes of phrases and/or keywords. As further described herein, in an embodiment, summary suggestion instructions 148 are programmed, in part, to output a summary and suggestion set 132 to transmit for display at computing device 102. In one embodiment, keyword store 170 may store key values and descriptions in a user's personal dictionary. The text stored by keyword store 170 may be encoded into tokens or other shorter representations, wherein the input raw sentence text is not stored.

In one embodiment, content processor 140 is coupled to or may access thread construction system 180. Thread construction system 180 may reconstruct an electronic message thread based on text fragments that have been received. As an example and not by way of limitation, the thread construction system 180 may retrieve metadata from the DOM of the webpage, so when a user expands the message, the thread construction system 180 may reconstruct the thread from the available data in a message, wherein a particular message includes all text of prior messages.

In one embodiment, content processor 140 is coupled to or may access a context extraction system 160, which may comprise a database, flat file system, object store, graph database, one or more machine learning models, or another data repository that stores a large number of evaluations, in association with category values or tags that specify a specific category or type of communication in which the suggestions could be substituted. Thus, any of checks 114A, 144B, 144C, and/or content processor 140 may be programmed for evaluating each particular text file using a trained multi-class text classifier machine learning model and receiving one or more classification outputs.

2.1 Context Extraction and Prediction

Figure 2A:
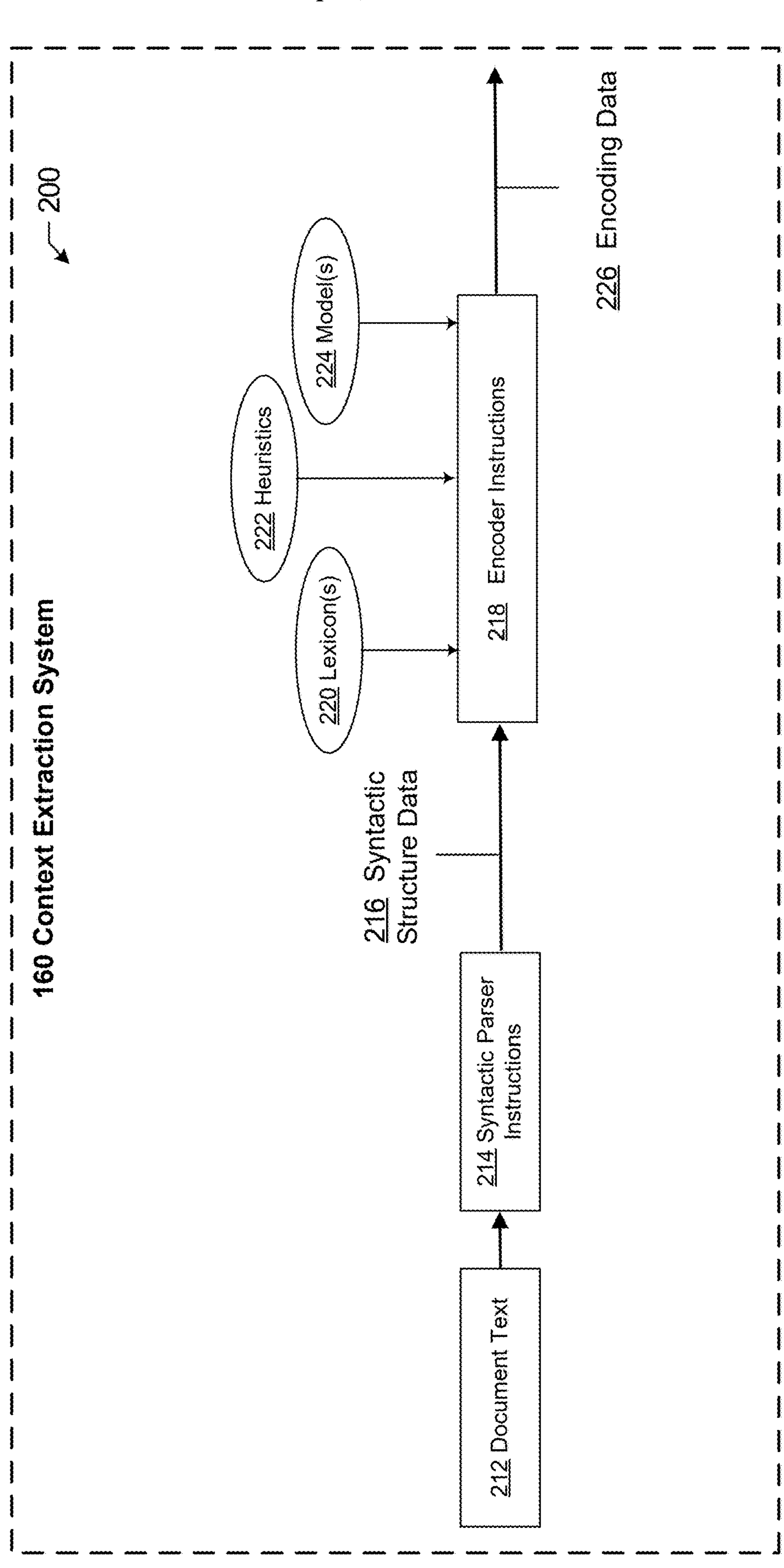
FIG. 2B illustrates an example flow diagram of a computer-implemented process of performing context extraction.
Figure 2B:
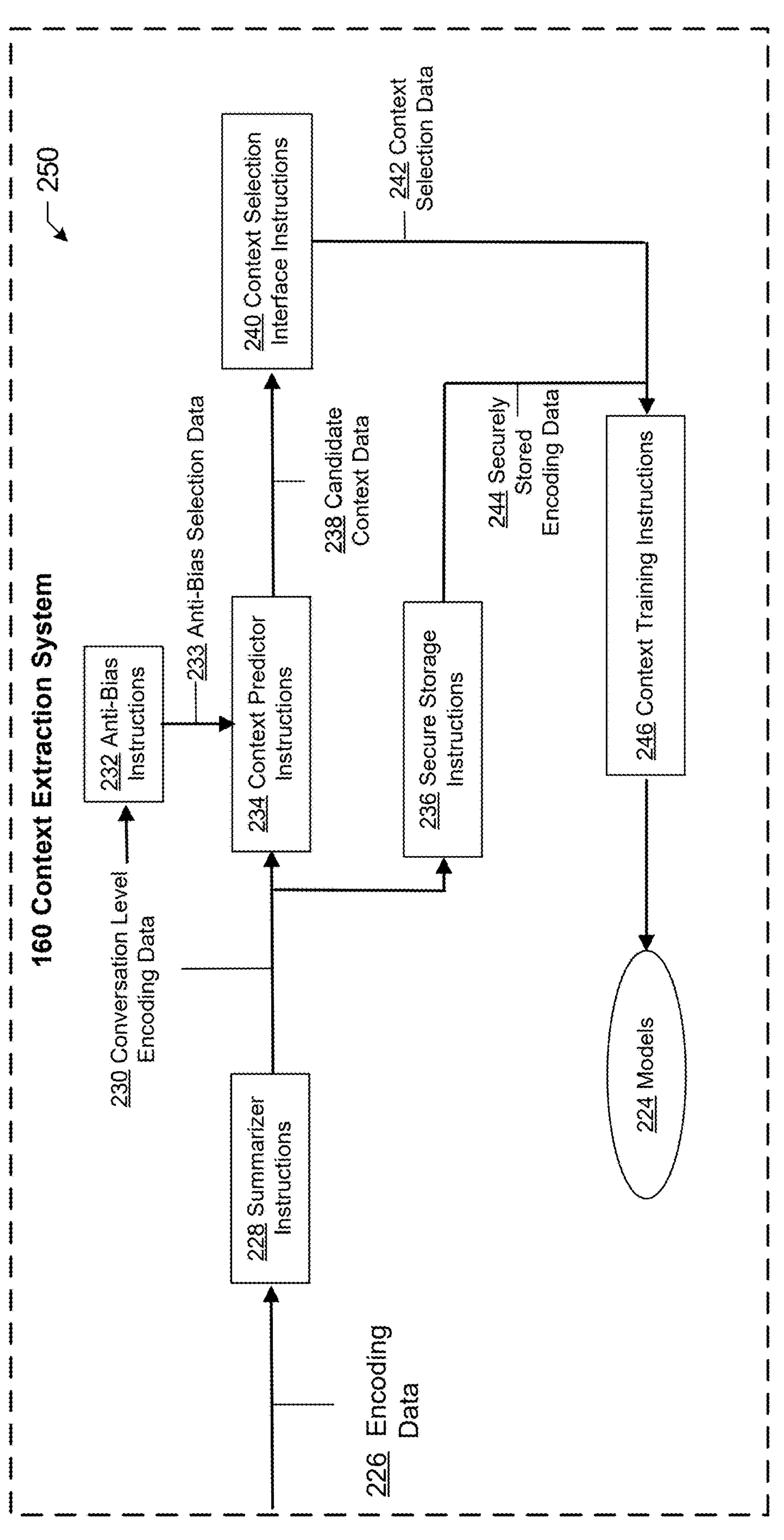

Each of FIG. 2A, FIG. 2B illustrates an example flow diagram of a computer-implemented process of performing context extraction. Referring first to FIG. 2A, an example computer system 200 shows the context of use and principal functional elements with which one embodiment of the context extraction system 160 could be implemented. FIG. 2A, FIG. 2B each illustrates only one of many possible arrangements of components configured to execute the programming described herein. Other arrangements may include fewer or different components, and the division of work between the components may vary depending on the arrangement.

In one embodiment, content extraction system 160 may be programmed to retrieve electronic digital data representing text from a user from the respective text processing extensions 110A or 110B via network 120. Network 120 may include one or more local area networks, wide area networks, campus networks, or internetworks in any combination, using any form of a link from among terrestrial or satellite, wired, or wireless network links. In some embodiments, content processor 140 may transmit the electronic data to content extraction system 160.

In one embodiment, content extraction system 160 may be programmed to receive, under digital program control, electronic digital data that represents text data processed into a text sequence in a first language, where the text sequence may include unstructured natural language text. "Unstructured text" as used herein may refer to text that lacks metadata or otherwise cannot readily be indexed or mapped onto database fields or objects. Unstructured text may include but is not limited to user-generated digital data.

In one embodiment, the context extraction system 160 may be programmed to receive encoding data 226. Encoding data 226 may include a text sequence of document text, syntactic structure for the text sequence, and the associated tone and tone scores produced by one or more machine learning models 224. One embodiment, as demonstrated by computer system 200 in FIG. 2A, involves the execution, by at least one processor, or computer code including syntactic parser instructions 214. Syntactic parser instructions 214 may operate on digital data including portions of document text 212, using one or more digital lexicons 220 and/or one or more digital heuristics 222 and/or machine learning models 224.

Encoder instructions 218, as well as portions of digital lexicons 220, digital heuristics 222, and/or machine learning models 224 may be written using any suitable computer programming language, such as Python, JAVASCRIPT, C, C++, and/or software development framework. For example, digital data, including portions of document text 212, digital lexicons 220, digital heuristics 222, and machine learning models 224 may be stored in a searchable database and/or a structured data file such as an XML (extensible Markup Language) file. In an embodiment, portions of document text 212, digital lexicons 220, digital heuristics 222, and machine learning models 224 may be stored in a reference data store. An example of the digital lexicons 220 is a searchable database or table that stores a mapping between raw text features, such as words and corresponding categories of tones and/or keywords. An example of mapping a raw text feature to a tone is "great: joyful," where "great" is the raw text feature (a word), "joyful" is the tone, and ":" indicates the mapping. Another example of the digital lexicons 220 is a searchable database or table that stores mappings of raw text features, such as words, word pairs, or phrases, with indications of tone intensity. An example of a mapping of a raw text feature to a tone intensity is "good: optimistic: +2," or "great: optimistic: +4," where the tone intensity is indicated by a numerical value. That is, both "good" and "great" map to the tone, "optimistic," but the tone intensity is higher for "great." In this way, the context extraction system 160 may identify both an overall tone of a particular message and/or the entirety of a thread.

An example of the heuristics 222 is a machine-implemented rule that when executed by a processor may determine when or whether a particular tone or a particular tone intensity is associated with a particular portion of a text sequence. In an embodiment, heuristics 222 may be configured to detect certain combinations of tones based on aspects of the syntactic structure of a text sequence. An example of heuristics 222 is "the presence of the word 'very' in a text sequence modifies the intensity of a detected tone or emotion." Another example of heuristics 222 is "the presence of the word 'not' in a text sequence reverses the sentiment (or polarity) of the text sequence." Yet another example of a heuristic 222 is "a particular tone (such as 'appreciation') is not associated with a text sequence unless the text sequence has a particular syntactic structure." A heuristic 222 may specify a word-level rule and/or a phrase-level rule. A heuristic 222 may be made up of a set of rules or a single rule.

In one embodiment, syntactic parser instructions 214 may be programmed to receive and process document text 212. Document text 212 may include one or more text sequences. In some embodiments, document text 212 may be received by a graphical user interface, such as a text editor or a front-end of a message authoring application. In one embodiment, during the processing of document text 212, syntactic parser instructions 214 may be programmed to extract a set of features from the first portion of the text sequence. Examples of the text sequence may include raw features such as n-grams, tokens, words, word pairs, phrases, and chunks of the text sequence. Syntactic parser instructions 214 be programmed to analyze the raw features using, for example, a statistical model, and produces computed features associated with the raw features. For example, computed features may include dependency relation data associated with particular word pairs or phrases of the first portion of the text sequence. As used herein, raw features and computed features may be referred to collectively as features.

In one embodiment, context extraction system 160 may deploy machine learning models 224 to process document text 212 to identify particular features (for example, mentions of people, organizations, keywords, dates, domains, etc.) wherein the identified features may be stored by keyword store 170. For example, machine learning models 224 may comprise a stateless model, wherein the model may inspect an email thread, calculate keywords and/or summarization points, display the summarization points, and then delete all data. As another example and not by way of limitation, machine learning models 224 may extract data, such as a project name, and store the project name in the keyword store 170 so that future summarization points are biased toward the particular project name. Alternatively, upon detecting a key point and/or keyword, machine learning models 224 may store key values in keyword store 170, and then upon detecting that the value is relevant to other communications, the context extraction system 160 may display the information as the user reads and/or writes other communications. In one embodiment, machine learning models 224 may display key points and/or keywords that other users have saved relating to the same key points and/or keywords. In this way, the context extraction system 160 may build a web or network of the relationship of communications and how they are used within an organization.

In an embodiment, machine learning models 224 may comprise a machine-learned statistical model such as a logistic regression model. That is, a logistic regression algorithm is applied to the training data to create machine learning models 324. In one version, machine learning models 224 comprise a binary classifier created using an open-source machine learning library such as the "vowpal wabbit" framework. In one particular embodiment, machine learning models 224 have a configuration that includes the following settings: individual learning rate, feature-normalized updates, safe/importance-aware updates, a logistic loss function, a generalized logistic function, max order of n-grams set to a positive integer less than 10 or less than 5, and a max order of skip-grams set to a positive integer less than ten or less than five and greater than the max order of n-grams value. In other embodiments, the parameter configuration of model 224 may be adapted to the requirements of a particular design or implementation of the system. Alternatively or in addition, machine learning models 224 can be trained or adapted using a reinforcement learning approach as described herein.

In one embodiment, in the case of a reinforcement learning approach, key points, keywords, and/or summarization suggestions may be presented to a user via a graphical user interface, and the user may rate or vote on one or more of the key points, keywords, and/or summarization suggestions through the graphical user interface. The user's ratings or votes received via the graphical user interface may be combined with the text sequence and/or the syntactic structure of the text sequence, using, for example, a concatenation function. For example, the combination of user feedback data and the text sequence and/or the syntactic structure data may be used as training data for machine learning models 224. In other embodiments, other forms and sources of training data may be used.

In one embodiment, encoding data 226 may further include weight values assigned by encoder instructions 218 to the tone scores produced by lexicons 220, heuristics 222, and machine learning models 224. For example, the output of machine learning models 224 may be used to increase or decrease weight values associated with the output of lexicons 220 and/or heuristics 222, where the weight values serve as numerical indicators of the relative significance of a particular tone with respect to a particular text sequence. In one embodiment, encoding data 226 may include weight values assigned by encoder instructions 218 to the identified keywords, key points, and summarization points produced by lexicons 220, heuristics 222, and machine learning models 224.

In one embodiment, tone predictions produced by machine learning models 224, which makes tone predictions based on historic instances of training data, may override tone determinations produced by one or more of the rule-based approaches. For example, machine learning models 224 may discard a tone prediction produced by one of the digital lexicons 220 or heuristics 222 based on an analysis of the input text sequence. In this way, encoder instructions 218 may be programmed to account for the possibility that a text sequence may have multiple different semantic interpretations and use machine learning models 224 to select the most probable semantic interpretation and associated tone prediction, given the training data used to create the machine learning models 224. As used herein, terminologies such as tone score, tone annotation, or tone label may be used herein to refer to digital data that provides an indication of a particular tone, a particular tone intensity, a particular tone polarity or sentiment, or a combination of any of the foregoing. Thus, for example, a tone score may indicate the presence or absence of a tone as well as its polarity and intensity. Similarly, terminologies such as pace score or pace label may be used herein to refer to digital data that provides an indication of a particular pace, etc.

In one embodiment, encoder instructions 218 may repeat operations on syntactic structure data 216 corresponding to other portions of document text 212. In an embodiment, encoding data 226 may be output for display to a user via a graphical user interface and/or provided as input to the context extraction process such as in flow diagram 250 of FIG. 2B.

Referring now to FIG. 2B, an example flow diagram 250 comprises a computer-implemented process of performing context extraction on the input text. The operations of flow diagram 250 as shown in FIG. 2B may be implemented using processor-executable instructions stored in computer memory. Although this disclosure describes the operations of FIG. 2B as being performed by computer system 100, this disclosure contemplates any suitable system, device, or implemented techniques.

In one embodiment, flow diagram 250 involves at least one processor executing computer code including summarizer instructions 228, context predictor instructions 234, anti-bias instructions 232, secure storage instructions 236, context selection interface instructions 240, and context training instructions 246. Instructions 228, 234, 232, 236, 240, and 246 may operate on digital data including encoding data 226. As an example, Instructions 228, 234, 232, 236, 240, and 246 may be written using any suitable computer programming language and/or software development framework. Digital data, including portions of encoding data 226, conversation-level encoding data 230, anti-bias selection data 233, candidate context data 238, context selection data 242, and securely stored encoding data 244 may be stored in computer memory as needed, for example, in a searchable database, reference store, and/or a structured data file such as XML (extensible Markup Language) file.

In one embodiment, summarizer instructions 228 may be programmed to receive, as input, encoding data 226, as generated by encoder instructions 218 for one or more text sequences of document text 212. For example, summarizer instructions 228 may synthesize tone and pace encoding data 326 of one or more particular text sequences and to generate conversation-level encoding data 230. For example, summarizer instructions 228 may be programmed to concatenate encoding data 226 for a particular conversation (for example, a particular email thread) to create conversation-level encoding data 230. As an example and not by way of limitation, an email thread between colleagues related to a specific project may be determined to have a "business" or "formal" tone, wherein an email thread between family members may be determined to have an "informal" or "friendly" tone. Identification of the tone in messages and/or the entirety of a particular message thread may be stored as conversation-level encoding data 230, which may be transmitted to the anti-bias instructions 232, context predictor instructions 234, and/or secure storage instructions 236.

Conversation between multiple parties over the course of a lengthy message thread may contain a plurality of different tones over the course of the conversation, as reflected in document text 212. In one embodiment, the context predictor instructions 234 may generate one or more predictions on the overall context of a particular message and/or message thread based on repeated tones and/or tones weighted more heavily. In one embodiment, based on keywords, key phrases, and/or tone data within encoding data 226, context predictor instructions 234 may generate candidate context data 238. For example, in a message thread between colleagues working on a particular project, the candidate context data 238 may contain the names of colleagues involved in the project, the name of the project, project deadlines, and an overall tone of colleagues when discussing the particular project.

In one embodiment, anti-bias instructions 232 may be programmed to periodically suppl anti-bias selection data 233, which may be used to incorporate one or more non-dominant tones within the candidate context data 238. For example, the anti-bias selection data 233 may be randomly selected tone scores that fall below a threshold tone probability value. For example, to avoid biasing the model based on the repeated selection of the most common tone, a low-scoring tone may be randomly selected and included in the set of candidate tones. This implements "exploration versus exploitation" and has been found to improve the accuracy of tone recommendations by allowing users to select a tone that is correct, but atypical. User feedback selecting a low-scoring tone is considered more accurate than the repeated selection of high-scoring tones. For example, anti-bias instructions 232 may be implemented using a second machine-learning model, such as a contextual multi-armed bandit model. Anti-bias instructions 232 may be implemented as a multi-armed bandit model using an open-source machine-learning framework such as "vowpal wabbit." Although this disclosure describes a multi-armed bandit machine-learning model, this disclosure contemplates any suitable machine-learning model.

In one embodiment, encoding data 226, summarizer instructions 228, and conversation-level encoding data 230 may be stored for a period of time. To protect encoding data 226 from unauthorized access, secure storage instructions 236 may be programmed to create a secure version of portions of encoding data 226 and the conversation-level encoding data 230. For example, secure storage instructions 236 may be programmed to generate a one-way hash value of each discrete portion of one or more text sequences using a cryptographic hash function. For example, secure storage instructions 236 may be programmed to hash each word, token, n-gram, or phrase within a message and/or message thread separately. In this way, secure storage instructions 236 enable the system to avoid unauthorized disclosure of the text sequence in the case of a security breach.

In one embodiment, candidate context data 238 may be transmitted to context selection interface instructions 240 for processing. Context selection interface instructions 240 may be programmed to convert candidate context data 238 into a display of a plurality of labels, such as keyword labels and tone labels. For example, context selection interface instructions 240 may be programmed to display, via a graphical user interface, one or more sets of labels corresponding to the context of the message and/or message thread. As another example and not by way of limitation, the context selection interface instructions 240 may cause displaying, via a graphical user interface, at least one graphical control element that is selectable to a user to provide a rating or vote for one or more labels.

In one embodiment, in response to the display of one or more context labels along with one or more graphical control elements for user rating and/or voting, the context selection interface instructions 240 may be programmed to output context selection data 242. Combined, the securely stored encoding data 244 and the context selection data 242 may be input to context training instructions 246. In one embodiment, context training instructions 246 may be programmed to feed the instances of context selection data 242 and securely stored encoding data 244 into one or more machine learning models 224. For example, to produce instances of training data, context selection data 242 may be mapped to the corresponding portions of securely stored encoding data 244 by evaluating hash values for individual portions of the input text sequence. In one embodiment, context selection data 242 may be linked with one or more particular locations of the input text sequence that gave rise to the context prediction on which user feedback was received. For example, if the context extraction system 160 predicts the context of a particular message is related to the "XYZ project," but the user inputs feedback of a "thumbs down," the context training instructions 248 may be updated. In this way, one or more machine-learning models 224 may be updated, modified, and adapted over time in response to user feedback.

2.2 Example Context Extraction System

Figure 3:
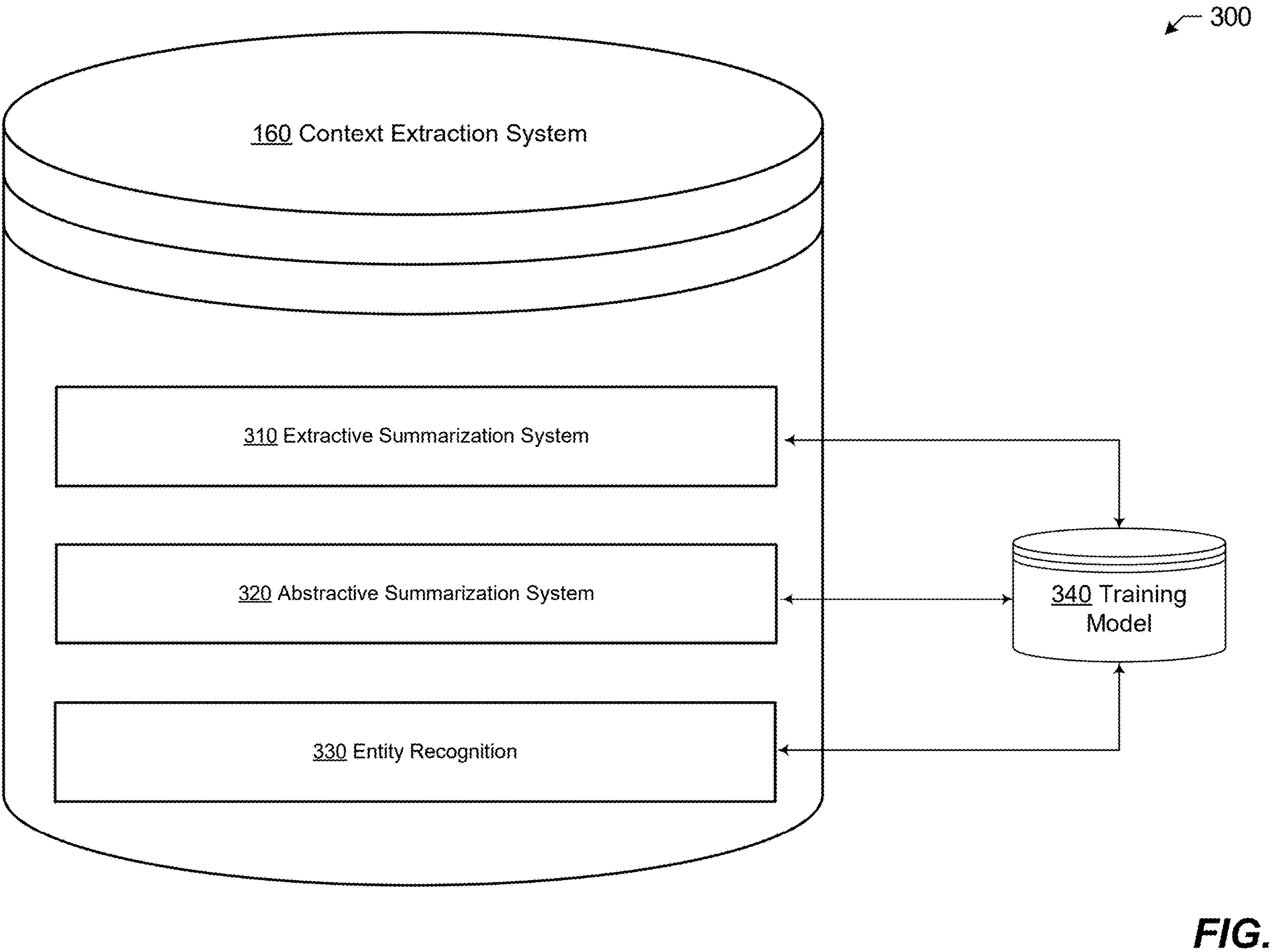
FIG. 3 illustrates an example computer system showing the context of use and principle functional elements with which one embodiment of the context extraction system could be implemented.

FIG. 3 illustrates an example computer system 300 showing the context of use and principle functional elements with which one embodiment of the context extraction system 160 could be implemented. In one embodiment, as demonstrated by computer system 300 of FIG. 3, the context extraction system 160 may be programmed to perform an extractive summarization process, an abstractive summarization process, and/or an entity recognition process. As discussed in connection with FIG. 2A, FIG. 2B, the context extraction system 160 may receive document text 212 (for example, an email, email thread, instant message, instant message thread), which may be processed by encoder instructions 218, resulting in encoding data 226. In one embodiment, the thread construction system 180 may construct email threads a user is engaged in reading and/or replying to. Keywords extracted from the thread may be stored in keyword store 170 and stored as encoding data 226. In one embodiment, context extraction system 160 may pass encoding data 226 through a series of sub-systems, such as extractive summarization system 310, abstractive summarization system 320, and/or entity recognition 330. In one embodiment, extractive summarization system 310, abstractive summarization system 320, and/or entity recognition 330 may operate in parallel, in sequence, or in any other suitable configuration.

As used herein, "extractive summarization" may refer to an information extraction system that may identify main points within document text 212. As an example and not by way of limitation, extractive summarization system 310 may parse document text 212 and remove text not identified as a keyword and/or key point. Extractive summarization system 310 of context extraction system 160 may be communicatively coupled to thread construction system 180, wherein one or more threads of document text 212 may be input into the extractive summarization system 310 and split the thread into a plurality of parts (for example sentences, tokens). In one embodiment, the plurality of parts (for example, sentences, and tokens) may be ranked by ranking instructions 150 based on one or more predetermined thresholds, data stores, or other criteria. Extractive summarization system 310 may interface with one or more training models 340.

As used herein "abstractive summarization" may refer to an information extraction system in which document text 212 as input may be shortened, resulting in a summarization of the text. In one embodiment, abstractive summarization system 320 may interface with training models 340, wherein context selection data 242, securely stored encoding data 244, and context training instructions 246 may be used as input to train the training models 340 to identify context and ultimately a summary. As an example and not by way of limitation, abstractive summarization system 320 may condense document text 212 to bullet points, one sentence, one paragraph, and/or dialogue-like texts (for example, emails, instant messages, SMS messages).

As used herein, "entity recognition" may refer to the identification of real-world objects and the object's respective type. In one embodiment, entity recognition 330 may identify an entity to be a person, geographical location, organization, and/or product. Although this disclosure discusses the aforementioned entities, this disclosure contemplates any suitable category of entities. As an example and not by way of limitation, context extraction system 160 may feed document text 212 into training models 340, wherein the document text 212 may include one or more tags (for example, is_person), wherein the training models 340 may identify the tags based on the syntactic structure of document text 212. In one embodiment, tags may be automatically generated for keywords and/or topics by context extraction system 160 by evaluating word distribution changes between texts. For example, if a particular email thread contains references to "bank" and "money", but switches to "OKRs" and "sprint" later in the particular email thread, the context extraction system 160 may infer that the thread contains different topics based on the different keywords. Further, context extraction system 160 may make higher-order inferences. As an example and not by way of limitation, training models 340 of context extraction system 160 may evaluate a particular email thread to find that "bank" appears with "money," "money" appears with "wallet", but "wallet" never appears with "bank."

In one embodiment, entity recognition 330 may ground entities to the "real world." For example, entity recognition 330 may identify "Jane Doe" in an online article and map the entity to a corresponding Wikipedia article. This process may occur when entity recognition 330 evaluates the context of the entity (for example, Jane Doe) and matches the entity to known patterns, as trained by training models 340 (for example, by identifying the word "scholar" within a particular portion of document text 212, if Jane Doe was described as a scholar).

In one embodiment, entity recognition 330 may perform coreference resolution, wherein a particular entity may be identified and tracked through document text 212. For example, a section of document text 212 may recite "Dimi is writing an email to Mary, he is very thorough." In this example, entity recognition 330 may determine that "Dimi" and "he" refer to the same entity (for example, the same person).

In one embodiment, context extraction system 160 may identify one or more questions within document text 212. Once one or more questions have been identified by context extraction system 160, training models 340 may refer to one or more question databases (for example, quora) and map a particular question to a particular answer, wherein the particular answer may be presented to a user as a suggestion. Alternatively, context extraction system 160 may identify one or more answers within document text 212, wherein once one or more answers have been identified, training models 340 may refer to one or more answer databases to map a particular answer to a particular question. In this example, the particular question may be displayed to the user via a graphical user interface as a suggestion.

In one embodiment, context extraction system 160 may operate independently from one or more training models 340 and/or machine-learning models. For example, URLs, email addresses, phone numbers, attachments, and quotes may be extracted by entity recognition 330 in the absence of machine-learning models.

2.3 Example Graphical User Interface

Figure 4:
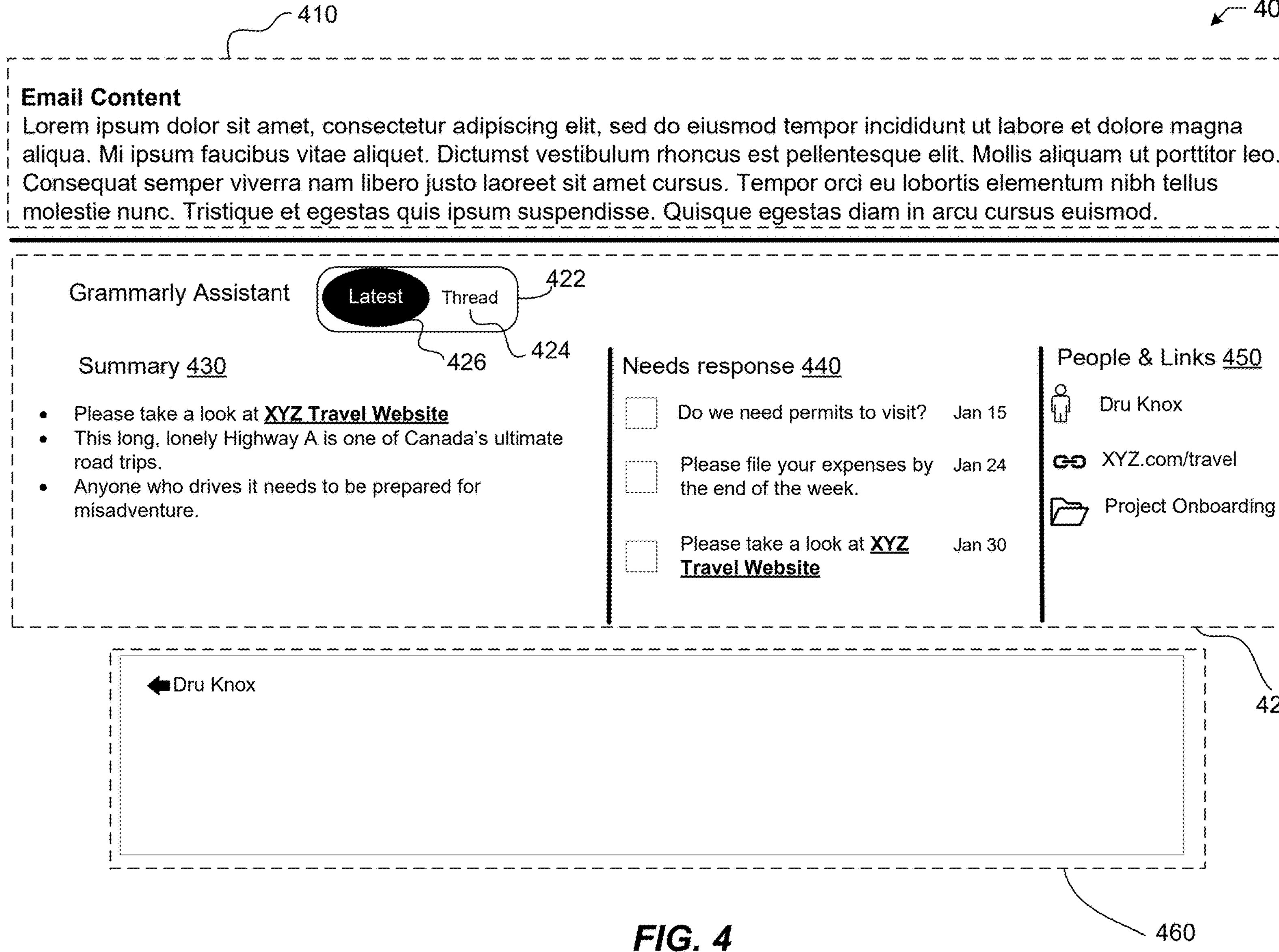
FIG. 4 illustrates an example screen display of a graphical user interface that may be programmed to extract data from email content.

FIG. 4 illustrates an example screen display 400 of a graphical user interface that may be programmed to extract data from email content 410. In one embodiment, one or more processors of computing device 110 may provide instructions to browser 108 to render application 106 as part of a GUI. In one embodiment, screen display 400 may comprise email content 410, assistant 420, and editable text field 460. As an example and not by way of limitation, document text 212 may be displayed as email content 410. In the example of screen display 400, the email content 410 displayed is demonstrated in the latest view 426. For example, the latest view 426 may display the most recent email of a continuous email thread. As another example, the latest view 426 may display the most recent instant message of a continuous message thread.

In one embodiment, assistant 420 may display a summary 430 of email content 410. For example, summary 430 may list and/or highlight relevant questions extracted from email content 410. In one embodiment, assistant 420 may display a list of action items 440, wherein items requiring a response may be displayed to the user. Further, identified links, entities, and/or other content may be displayed to the user in section 450.

In one embodiment, toggle 422 may present a user with an option to switch between the latest view 426 of email content 410 to thread view 424 of email content 410. In thread view 424, assistant 420 may display a summary of the entirety of the email or message thread.

In one embodiment, an editable text field 460 may be displayed to a user. It is understood that editable text field 460 may allow for free-form text entry. As another example and not by way of limitation, context extraction system 160 may present one or more of a summary and suggestion set 132 within editable text field 460, wherein a user may respond with auto-generated suggestions at the click of a button.

Figure 5:
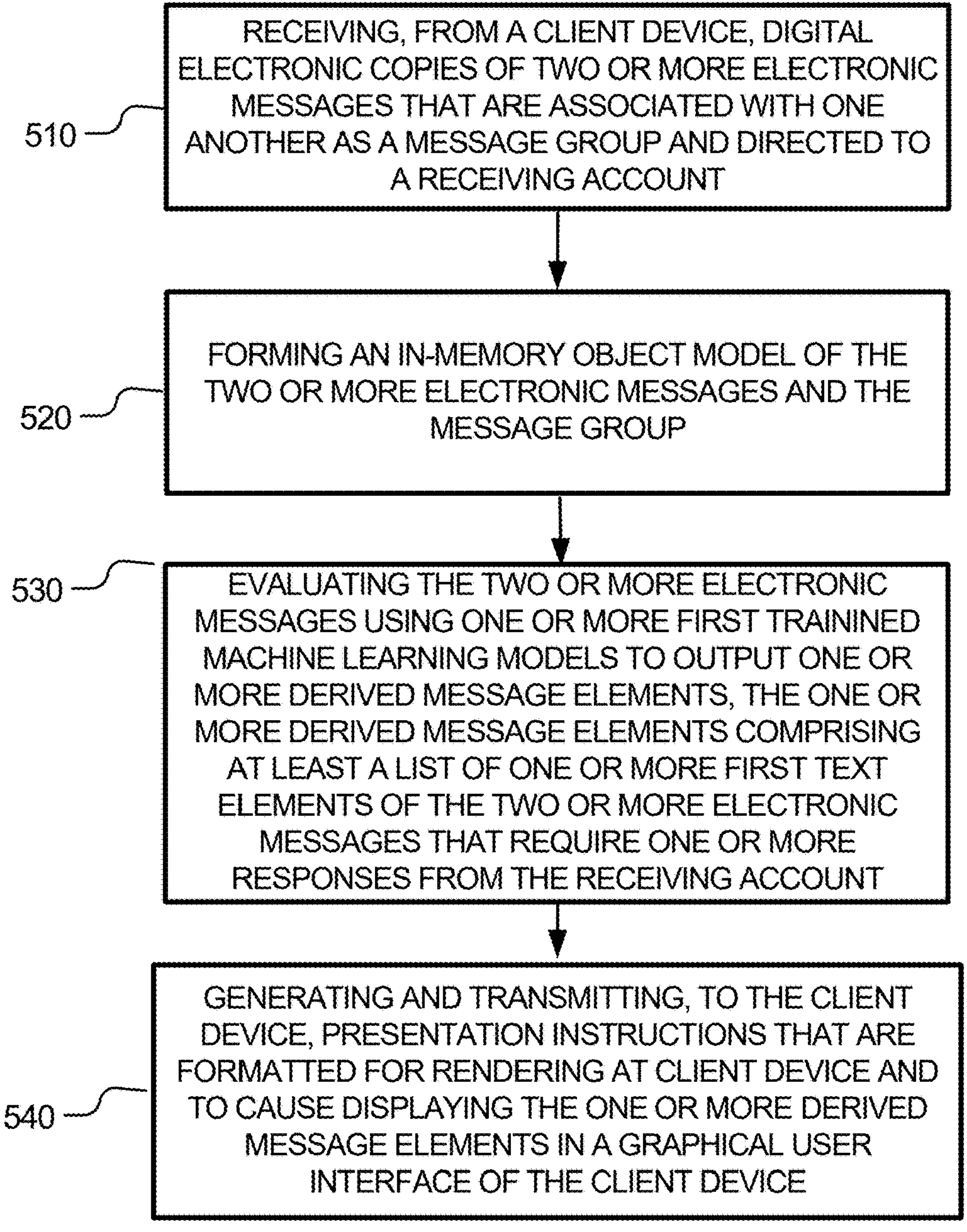
FIG. 5 illustrates a flow diagram of a process that may be executed by at least one device of the computer system of FIG. 1.

FIG. 5 illustrates a flow diagram 500 of a process that may be executed by at least one device of the computer system of FIG. 1.

At step 510 of FIG. 5, in an embodiment, a computer-implemented method may receive, from a client device, digital electronic copies of two or more electronic messages that are associated with one another as a message group and directed to a receiving account. As an example and not by way of limitation, two or more electronic messages may be electronic mail messages that are related to one another as a message thread.

In one embodiment, at step 520, the method may continue by forming an in-memory object model of the two or more electronic messages and the message group.

At step 530, the method may continue by evaluating the two or more electronic messages using one or more first trained machine learning models to output one or more derived message elements comprising at least a list of one or more first text elements of the two or more electronic messages that require one or more responses from the receiving account. As an example and not by way of limitation, one or more derived message elements may comprise one or more identifiers of named entities, persons, or accounts that are specified in the two or more electronic messages and/or the message group. One or more derived message elements may comprise at least a set of key takeaways from the two or more electronic messages and/or the message group. As an example and not by way of limitation, one or more derived message elements may comprise at least a summary of the two or more electronic messages and/or the message group. In one embodiment, the presentation instructions are formatted to cause displaying, at the client device, each keyword in the set of keywords using a keyword hyperlink, wherein each keyword hyperlink may be formatted to cause, when selected, displaying one or more second text elements of the two or more electronic messages. As an example and not by way of limitation, the one or more second text elements may be semantically related to the keyword of the keyword hyperlink.

In one embodiment, the method may digitally store, in a personal dictionary repository that is associated with a recipient account identifier that is based on the receiving account, the one or more derived message elements and one or more encoded versions of one or more portions of the two or more electronic messages upon which the one or more derived message elements are based.

In one embodiment, the method of FIG. 5 may further include receiving a changed text from the client device, the changed text comprising at least a portion of a third electronic message that is associated with the two or more electronic messages. The method may evaluate the changed text using a second trained machine learning model to output a probability value specifying a probability that the changed text is a response to the one or more first text elements of the two or more electronic messages that require the one or more responses from the receiving account. As an example and not by way of limitation, the method may determine that the probability value is greater than a specified threshold value and, in response thereto, generate and transmit, to the client device, updated presentation instructions that are formatted for rendering at the client device and to cause updating the graphical user interface of the client device to remove at least one of the derived message elements.

At step 540, the method may continue by generating and transmitting, to the client device, presentation instructions that are formatted for rendering at the client device and to cause displaying one or more derived message elements in a graphical user interface of the client device. As an example and not by way of limitation, two or more electronic messages may be displayed on the client device in an HTML document. The method may further include obtaining access to a document object model of the HTML document. As an example and not by way of limitation, the method may continue by detecting a change in the DOM that is associated with the client device expanding a text display of one or more of the two or more electronic messages, obtaining updated text of the two or more electronic messages from the DOM, and repeating the forming, evaluating, generating and transmitting based on the updated text.

In one embodiment, the user may be prompted to submit feedback specifying an approval or disapproval of one or more derived message elements. The method may receive, from the client device, a feedback input specifying an approval or disapproval of one or more derived message elements and update one or more machine learning models based on the feedback input.

Figure 7A:
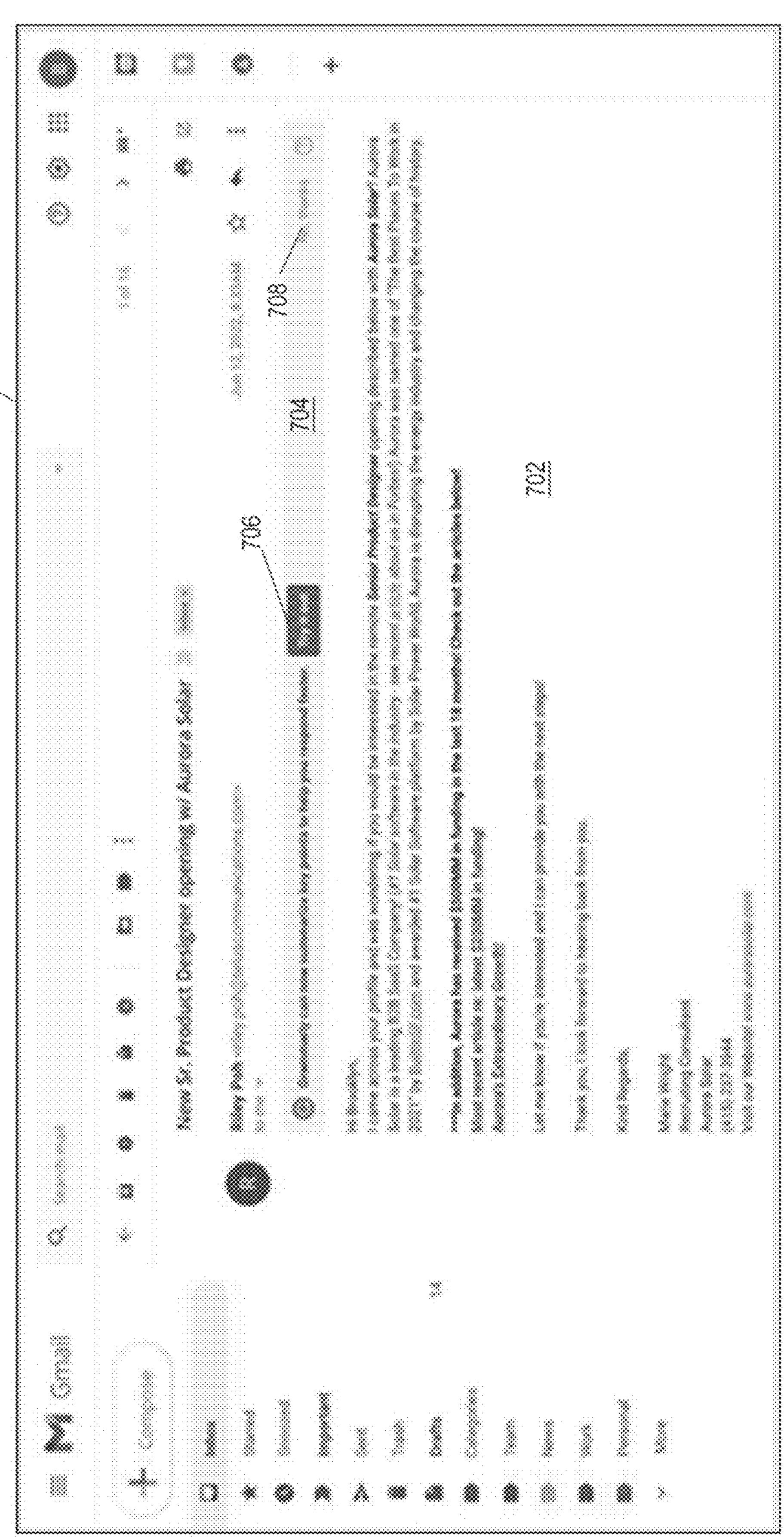
FIG. 7A illustrates an example graphical user interface (GUI) for an embodiment.

FIG. 7A illustrates an example GUI interface for an embodiment. In the example of FIG. 7A, a window of a GUI 700 comprises an email panel 702 that displays an email message that a user has received. The example email panel 702 is rendered in a browser window after an internet browser executing on a user's computer has accessed an online web-based application, such as GMAIL from GOOGLE. In an embodiment, a computer-implemented method is programmed as a browser plug-in and programmed to detect a message opening operation and, in response, to generate and display a graphical bar 704 in the email panel 702. The graphical bar 704 comprises a text notification that prompts the user to access a summarization function or tool and comprises an activation link 706 and a decline link 708, each of which can be programmed as active hyperlinks or other GUI widgets. In response to an input selecting the decline link 708, the method is programmed to visually remove the graphical bar 704 from the email panel 702. In response to an input selecting the activation link 706, the method is programmed to update the display to a changed state as seen in FIG. 7B.

In this manner, the embodiment of FIG. 7A provides an opt-in experience that is unintrusive, positioned at the top of a message, to be seen before the user reads the message. In an embodiment, the opt-in experience of FIG. 7A triggers only for high-value emails; a machine learning model can be trained to predict whether a particular email represents high value, based on metrics such as length, the role of the sender, the complexity of the content, and other factors.

Figure 7B:
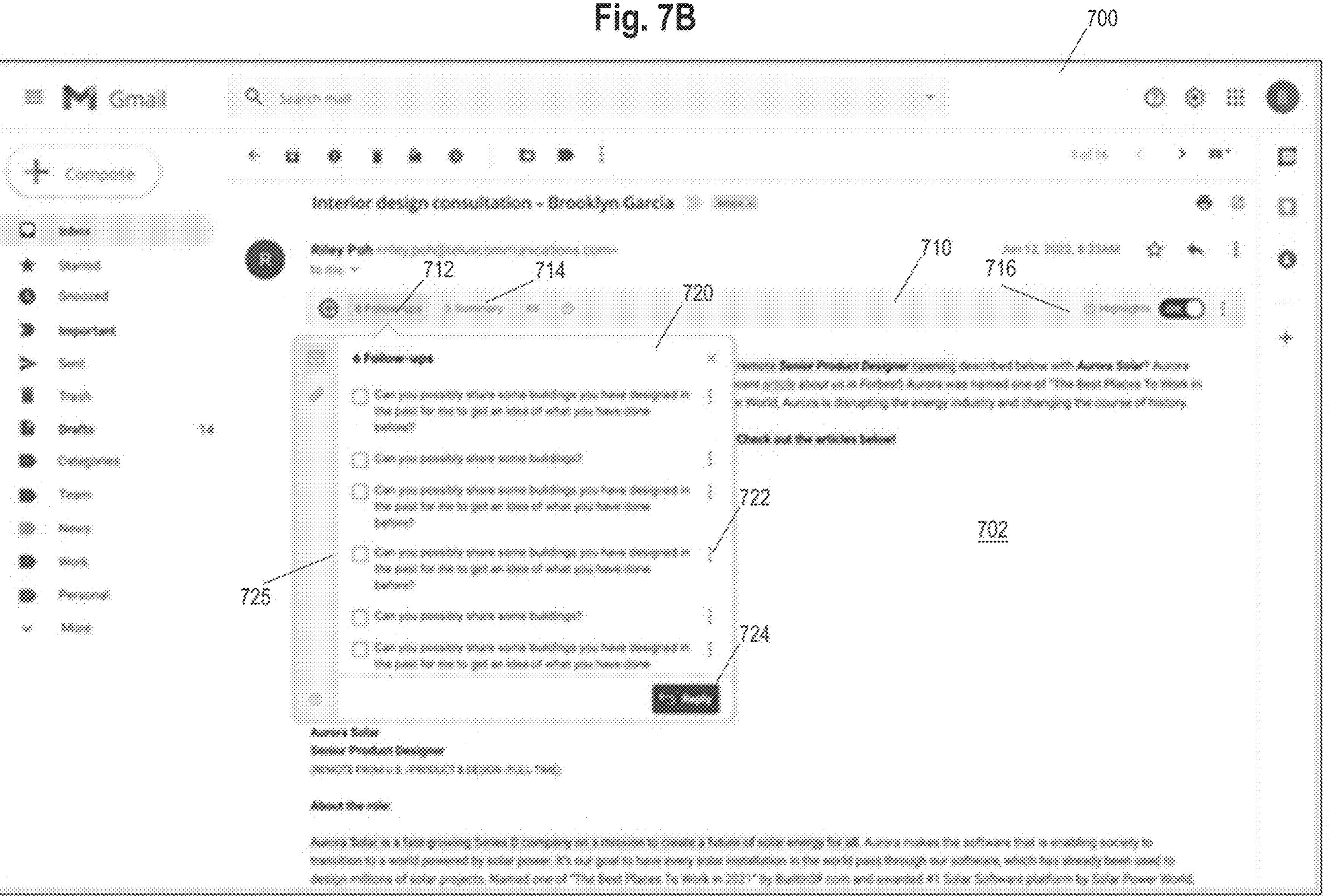
FIG. 7B illustrates an example GUI for a reading experience with a recap bar and highlights.

FIG. 7B illustrates an example GUI for a reading experience with a recap bar and highlights. In an embodiment, in response to an input selecting the activation link 706, the method is programmed to update the display to replace the graphical bar 704 with a recap bar 710 comprising a follow-up link 712, summary link 714, and highlight toggle widget 716. In an embodiment, the follow-up link 712 is programmed to display a count of the number of follow-up issues or topics that have been detected automatically via machine analysis of the text of the email message in the reading window, after submitting the text to one of the machine learning models that has been previously described, using one of the checks. In an embodiment, in response to an input to select the follow-up link 712, the method is programmed to display a follow-up panel 720 as a visual overlay over the email window, comprising a plurality of follow-up items 722 and a REPLY widget 724. Each of the follow-up items 722 comprises a checkbox 725, which is programmed as an active, selectable GUI widget. In response to input specifying one or more of the checkboxes 725, and a selection of the REPLY widget 724, the method is programmed to automatically generate, using machine learning model prediction and/or generative AI techniques, new content corresponding to the follow-up items in a reply message in an updated email panel or window of the GUI.

In an embodiment, the summary link 714 is programmed to display a count of summary items derived from the email, and the highlight toggle widget 716 is programmed when in the ON state, to visually highlight the summary items in the email panel 702.

Thus, the recap bar of an embodiment has a compact user interface at the top of a message, thereby supporting intuitive navigation between messages. Users have streamlined access to a summary and follow-ups to better triage and skim messages. The quick counts of follow-ups and key points give a sense of urgency and information density. The summary and follow-up bars and panels give a condensed, readable summary of the message. Inline highlights allow the user to jump directly to important points.

Figure 7C:
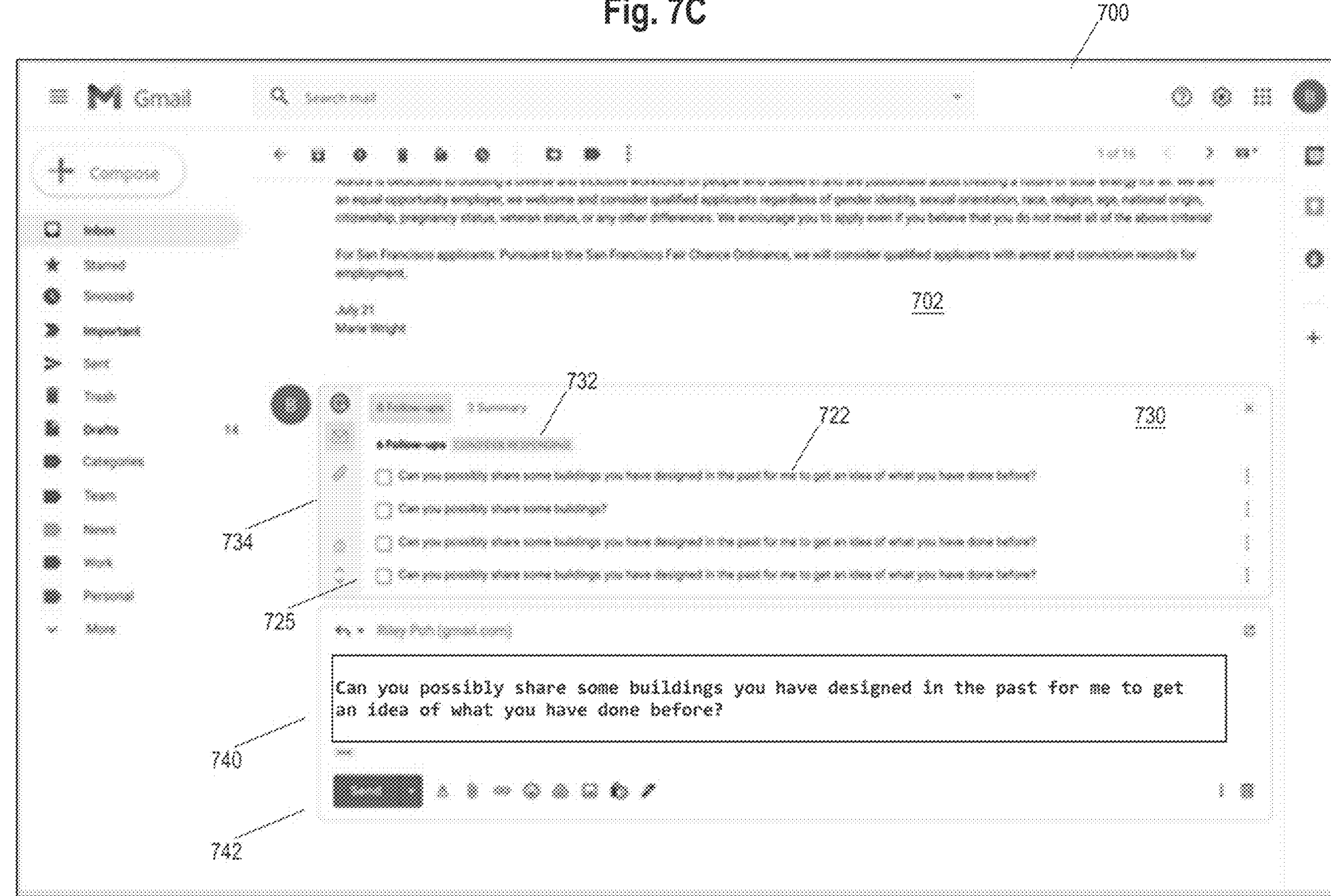
FIG. 7C illustrates an example GUI for a reply experience.

FIG. 7C illustrates an example GUI for a reply experience. A more in-depth experience focused on follow-ups is available when the user begins a reply. In an embodiment, FIG. 7C shows GUI 700 of FIG. 7A, FIG. 7B in which the recap bar 710 has been removed in response to a selection of the REPLY widget 724 (FIG. 7B) and replaced with a follow-up panel 730 that is displayed in an enlarged form, compared to the recap bar 710, and visually adjacent to a reply email panel 740. The follow-up panel 730 comprises a notification region 732 that can be programmed to display the count of available follow-up topics and a prompt to respond to one or more of the topics. The follow-up panel 730 further comprises the follow-up items 722, checkboxes 725, and a side panel 734 that displays one or more control widgets such as file attachment tools and scroll tools. In an embodiment, the reply email panel 740 comprises reply text that has been generated automatically and inserted into a reply email panel, window, region, or area of the email client, which also can include reply message tools 742 such as a SEND widget, and controls for various message attributes or text attributes. In an embodiment, the reply text in the reply email panel 740 comprises new content corresponding to the follow-up items that has been automatically generated, using machine learning model prediction and/or generative AI techniques, in response to input in the GUI 700 of FIG. 7B specifying one or more of the checkboxes 725, and a selection of the REPLY widget 724.

Embodiments can be supported by training or re-training the machine learning models that have been previously described based on email data, with awareness of line breaks, to assist in correct predictive processing with signatures or greetings included in the summary, combining headers with the sentence following, missing important points, signature detection and filtering, and model-based detection of follow-ups to boost recall.

Figure 7D:
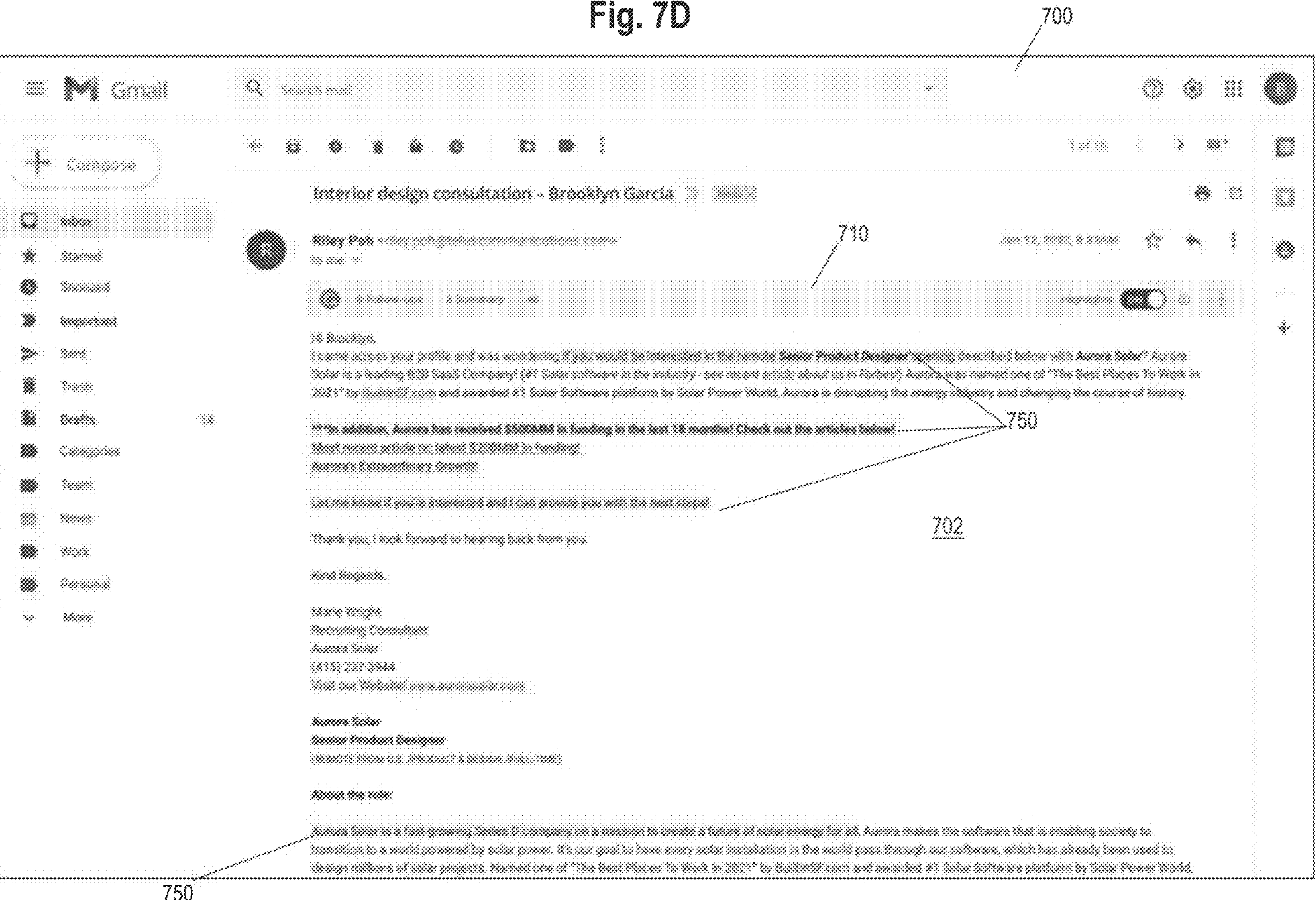
FIG. 7D illustrates an example of a summary window GUI that can be used in an embodiment.

FIG. 7D illustrates an example of a summary window GUI that can be used in an embodiment. In the example of FIG. 7D, the GUI 700 comprises the email panel 702. In response to opening the message to read the message, the method is programmed to submit the text of the received email message in email panel 702 to one of the machine learning models that has been previously described and to receive, in response, data representing screen positions of key takeaways, important sentences or clauses, or other material representing a summary of the message. In response, the method is programmed to update the email panel 702 to visually emphasize or identify the summary portions using a distinct visual representation; examples include underlining, shading, highlighting, with or without colors, and/or other text effects. In the example of FIG. 7D, a plurality of visually emphasized clauses 750 include "if you would be interested in the remote Senior Product Designer opening", "*In addition, Aurora has received $500 MM in funding . . . ", "Let me know if you're interested and I can provide you with the next steps!", and "Aurora Solar is a fast-growing Series D company . . . ," and the latter of these is seen at the end of the message at the bottom of FIG. 7**D.

Figure 7E:
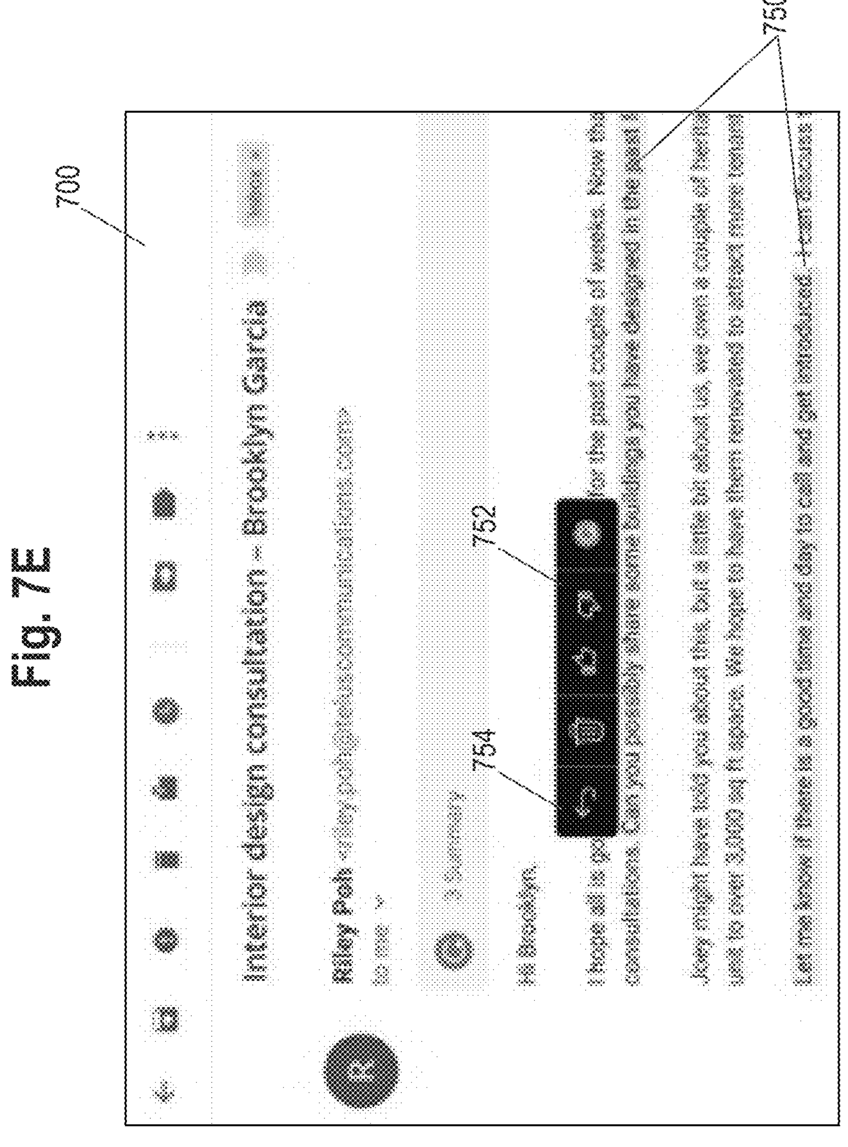
FIG. 7E illustrates an example of a portion of the GUI of FIG. 7D with a tool panel.

In an embodiment, user input specifying hovering over or selecting one of the visually emphasized clauses causes displaying of a tool panel of visual icons corresponding to actions or operations. FIG. 7E illustrates an example of a portion of the GUI of FIG. 7D with a tool panel. In the example, in response to user input specifying hovering over or selecting a visually emphasized clause 750, the method is programmed to update the GUI 700 to display a tool panel 752 with a plurality of active hyperlinks, icons, or GUI widgets that correspond to actions or operations. In one embodiment, in response to input specifying a selection of a reply widget 754, the method is programmed to copy and enter the corresponding visually emphasized clause 750 into a reply window of the email client.

Figure 8A:
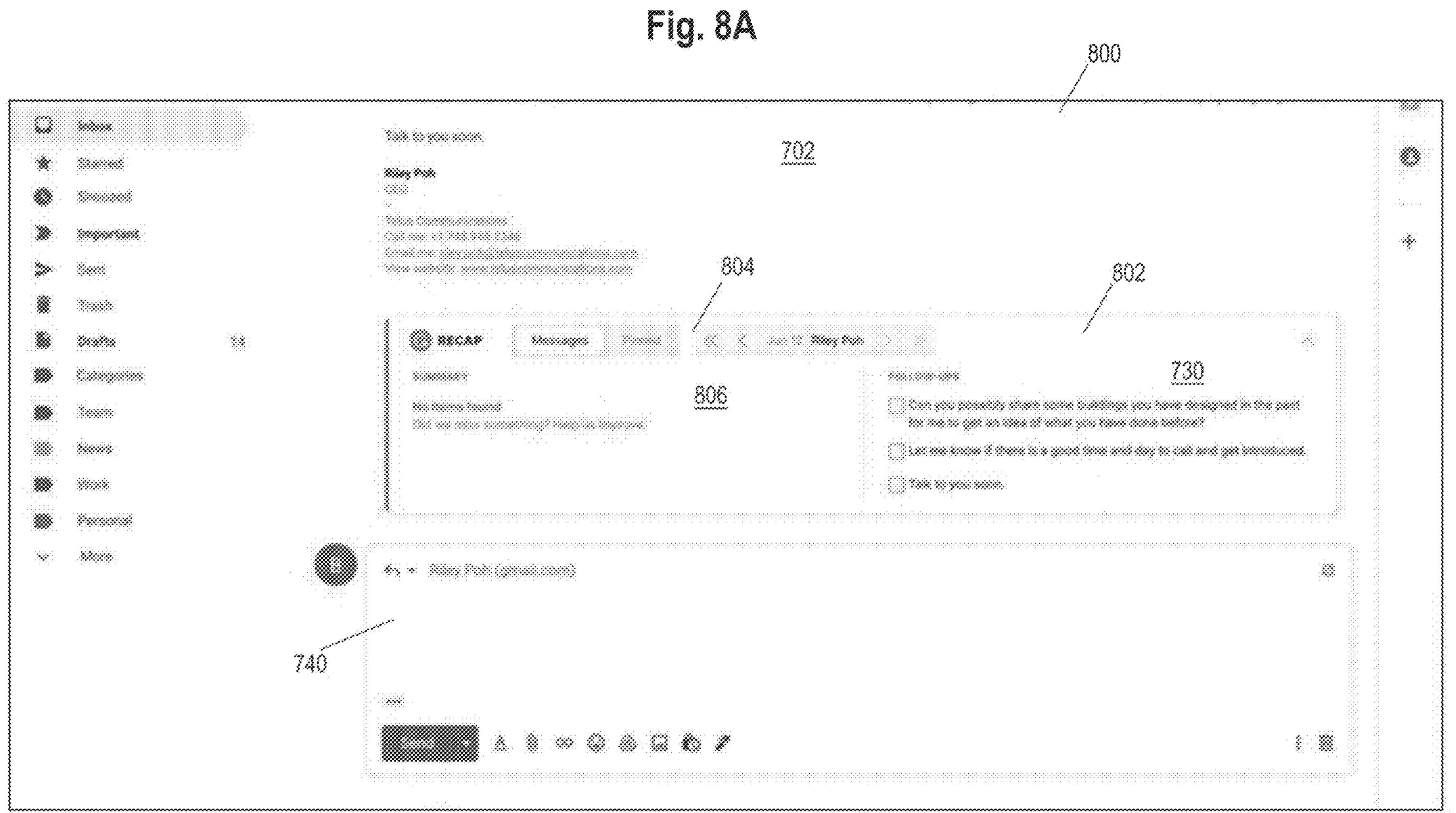
FIG. 8A illustrates an example of a recap window GUI that can be used in one embodiment.

FIG. 8A illustrates an example of a recap window GUI that can be used in one embodiment. In the example of FIG. 8A, a GUI 800 comprises an email panel 702 like the preceding diagrams in which a user can read a message that has been received. In an embodiment, in response to opening the message, the method is programmed to display a recap panel 802 in an area near the end of the message; if the user selected a widget to reply to the message, then the recap panel can appear between the message and the reply email panel 740 to enable the user to study the recap panel while composing a reply. In an embodiment, the recap panel 802 comprises a toolbar 804, which can comprise one or more active links or widgets to select all messages, pinned messages, or scroll through or read successive messages in a forward direction or backward direction.

In an embodiment, the recap panel 802 comprises a summary panel 806 that is programmed to display a summary of the message that was received. The summary can comprise a plurality of short phrases or clauses that have been extracted from the message and/or determined to represent the most important parts of the message. In an embodiment, content items in the summary, such as sentences, clauses, or phrases, appear in the same order as they appear in the original message.

In an embodiment, the recap panel 802 comprises a follow-up panel 730 that displays a plurality of follow-up items in a manner similar to FIG. 7B, but in a compact visual format in which the follow-up panel is adjacent to or laterally near the summary panel 806. In one embodiment, the summary panel 806 and the follow-up panel 730 can comprise two adjacent visual rectangles of the same size.

Embodiments can be programmed to initiate the displays of the preceding drawing figures only for specified kinds of text, documents, or emails. For example, an embodiment can be programmed to respond only when an email contains text, and/or only when an email has sending and receiving addresses that appear to be associated with individual persons rather than machines or systems. In one embodiment, in response to detecting that a message is from a machine, bot, or server to an individual account, or in response to determining that a confidence level is low concerning whether the message is from a person to a person, the method can be programmed to display a notification similar to the opt-in message of FIG. 7A. For example, such messages can be displayed with the notification "This summary includes content from this message that you may not need. SHOW ANYWAY" where SHOW ANYWAY is a hyperlink which, when selected, causes updating the display as seen in FIG. 7B, FIG. 7C, FIG. 7D, FIG. 8A. A separately trained machine learning model, which has been trained to classify non-individualized messages from machines, systems, commercial, or spam sources, can be used to drive programmatic decision-making for this purpose. Thus, when an automated message, spam message, or other non-individualized message is received, the method can be programmed to require an affirmative opt-in to display a summary, recap, or follow-up.

Figure 8B:
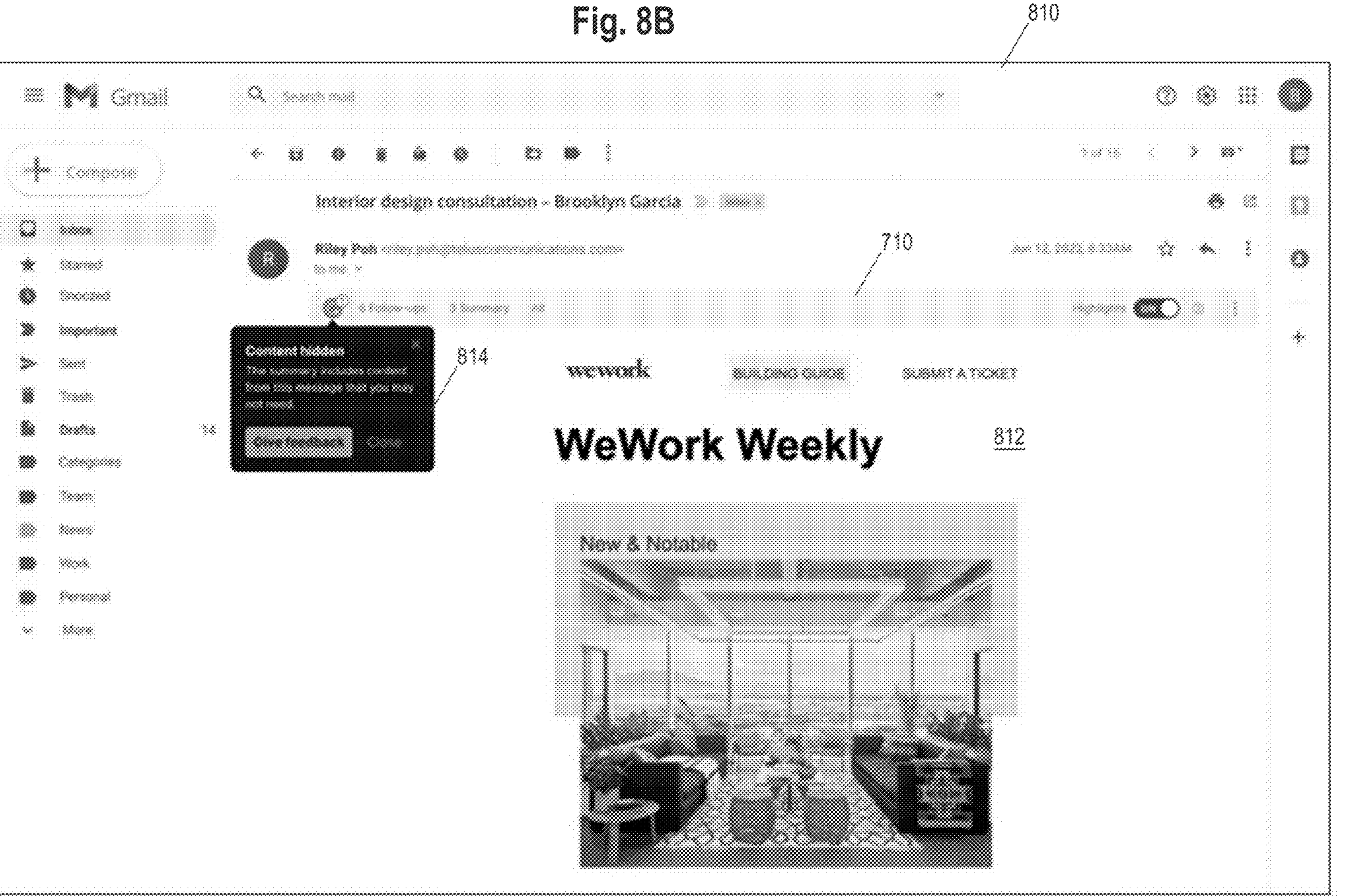
FIG. 8B illustrates an embodiment of a visual notification that a summary and follow-ups are provided but may be unnecessary

In some embodiments, the recap is provided anyway, but not the summary or follow-ups. Additionally or alternatively, an embodiment can be programmed to display a visual notification that a summary and follow-ups are provided but may be unnecessary. FIG. 8B illustrates an embodiment of a visual notification that a summary and follow-ups are provided but may be unnecessary. A GUI 810 comprises an email panel 812 that displays a commercial message. As in FIG. 7B, a recap bar 710 is displayed in association with the message, but in the embodiment of FIG. 8B, the recap bar further comprises a notification 814 indicating that the summary includes content from the message that the user may not need. The notification 814 can comprise a pop-up panel that is displayed when the message is first read, with active links like GIVE FEEDBACK and CLOSE which can be selected to dismiss the notification or correct the machine learning model by labeling the notification as correct or incorrect. In an embodiment, the notification 814 can be visually hidden in association with a graphical icon of the recap bar 710 and displayed only when user input specifies hovering a cursor over the icon.

Figure 9:
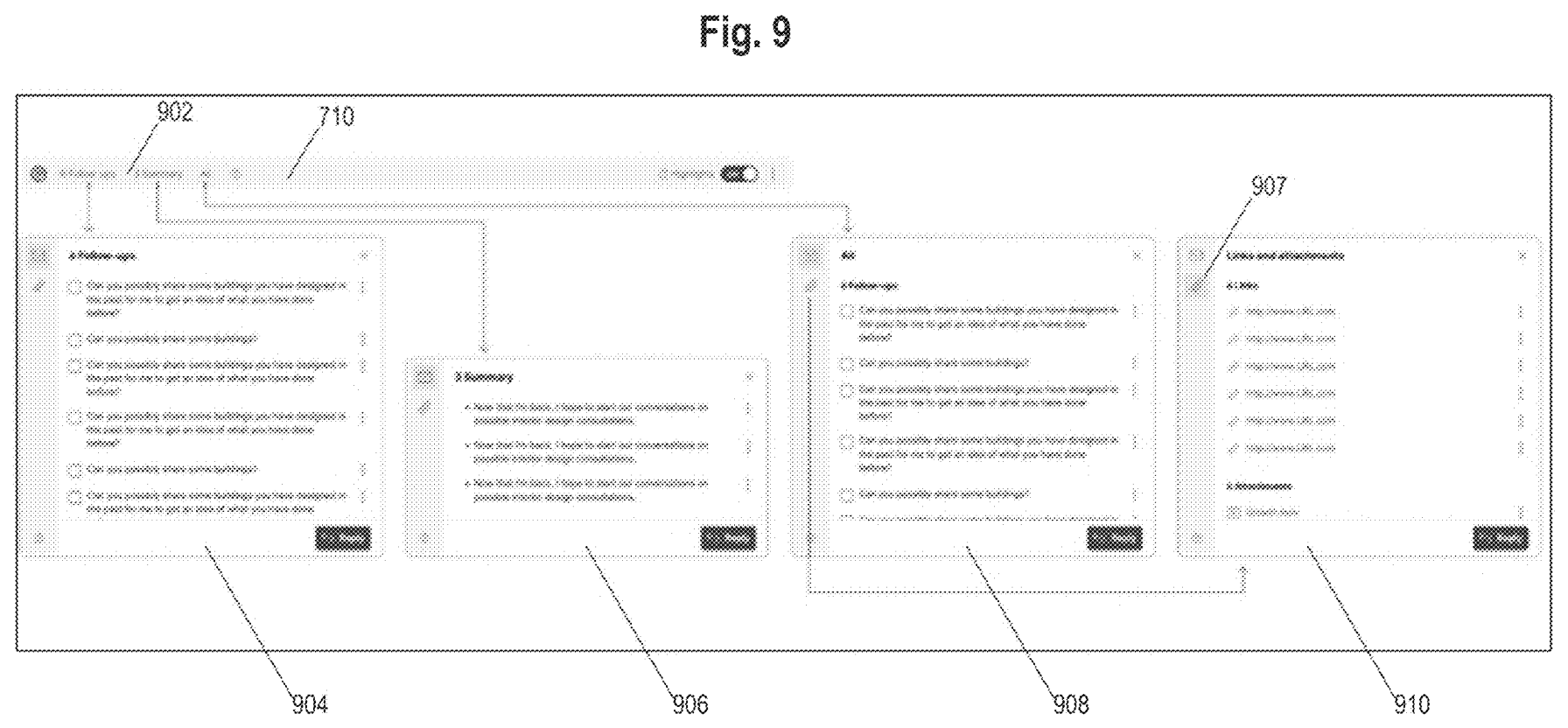

In an embodiment, the method is programmed to stack content, thereby always showing content when a user is interested. FIG. 9 illustrates an example of transitions from the recap bar to other panels of information that can be programmed to display in response to selections of links or widgets within the recap bar. FIG. 9 shows the recap bar 710 of prior drawing figures in a separated, schematic state to illustrate how selections of links or icons 902 in the recap bar can cause the method to transition to visually displaying other panels. For example, the recap bar 710 can be programmed, in response to the selection of a FOLLOW-UPS link, to display a follow-up panel 904 that lists follow-up items, as seen in prior drawing figures. Further, the recap bar 710 can be programmed, in response to the selection of a SUMMARY link, to display a summary panel 906 that lists summary sentences, clauses, or phrases. Finally, the recap bar 710 can be programmed, in response to the selection of an ALL link, to display both a summary panel 908 that lists summary sentences, clauses, or phrases and a links and attachments panel 910 with links and attachments from within the email message. In an embodiment, selecting a link icon 907 in the summary panel 908 causes the method to visually display the links and attachments panel 910.

2.4 Extensions and Alternatives

Embodiments are effective in providing automated, computer-supported writing assistance for replying to emails in an efficient manner. Studies have shown that 11% to 15% of time spent in email client programs involves writing responses. The task of writing a response requires gathering all the writing points, then composing the response with the writing points ready. The recap functions of the present disclosure efficiently support gathering the writing points, and other functions assist with composing by entering data automatically in a reply window. Embodiments provide the ability to cross-reference the reply text to follow-ups that have been automatically identified from the received message, making responding faster and more efficient.

Embodiments can process text other than email. Examples include documents that are collectively organized in an inbox but do not constitute email, such as chat messages, instant messaging system messages, social media posts, discussion forum posts, calendar items, tasks in task lists, issues in issue tracking systems, and documents in collaborative document editing or control systems.

Embodiments also can be programmed to collect, store, and use data based on user interaction with and use of the functions that have been previously described. For example, as an embodiment becomes widely used by large numbers of knowledge workers, the interaction of those workers with the embodiment will generate new data. Examples include contextual data on what users are reading, structural understanding of text users are reading, contributing data to a knowledge graph, an extensible UX earlier in the communication journey where new features can be surfaced, and indications of new reading use cases.

Embodiments can find use in automatically identifying data in enterprise documents that can contribute to enterprise knowledge bases, knowledge hubs, glossaries, or dictionaries. The same automatically identified data can be copied to a corpus useful in training enterprise machine learning models, including curated, factually accurate, enterprise large language models. For example, an embodiment can be programmed to update a training data set, corpus, or database in response to processing an email, document, message, or other text and determining summary items, recap items, or follow-up items. All such items can be copied to or contribute to enterprise LLM training data or serve as the basis for updating enterprise knowledge bases, knowledge hubs, glossaries, or dictionaries. Examples of suitable content for training data include the follow-ups of panel 720, items for which checkboxes 725 are checked and used in a reply email panel 740, items in a recap panel 802, visually emphasized clauses 750 of a summary, and all content of FIG. 9. In an embodiment, user selection of visually emphasized clauses 750 using the tool panel 752 can increase the weight of a content item for training purposes or serve as an endorsement or vote to include the item in enterprise knowledge bases, knowledge hubs, glossaries, or dictionaries.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
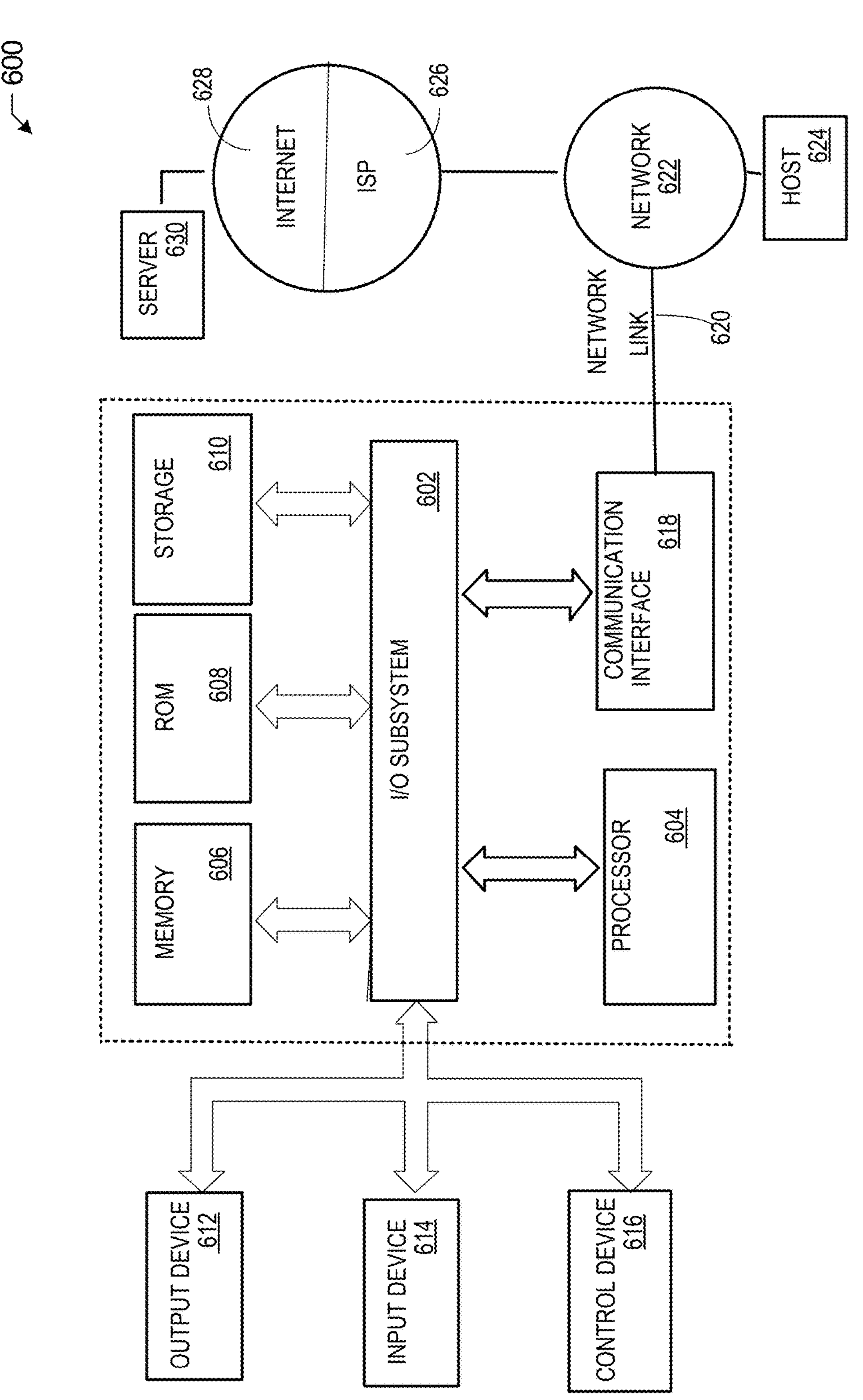
FIG. 6 illustrates a computer system with which one embodiment could be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanisms for communicating information and/or instructions between the components of the computer system 600 over electronic signal paths. The I/O subsystem 602 may include an I/O controller, a memory controller, and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU), or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or another dynamic storage device. Memory 606 also may be used for storing temporary variables or other intermediate information during the execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read-only memory (ROM) 608 or other static storage devices coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, solid-state storage, magnetic disk, or optical disks such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608, or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 600 may be coupled via I/O subsystem 602 to at least one output device 612. In one embodiment, output device 612 is a digital computer display. Examples of a display that may be used in various embodiments include a touchscreen display or a light-emitting diode (LED) display or a liquid crystal display (LCD) or an e-paper display. Computer system 600 may include another type of at least one output device 612, alternatively or in addition to a display device. Examples of the output device 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections, or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. The control device 616 may be a touchpad, a mouse, a trackball, or cursor direction keys for communicating direction information and command selections to processor 604 and for controlling cursor movement on a computer display. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism, or another type of control device. An input device 614 may include a combination of multiple different input devices, such as a video camera and a depth sensor.

In another embodiment, computer system 600 may comprise an Internet of Things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders, and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host computer 624 or server computer 630.

Computer system 600 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in memory 606. Such instructions may be read into memory 606 from another storage medium, such as storage 610. Execution of the sequences of instructions contained in memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 602. Transmission media can also take the form of acoustic or light waves, such as those generated during radio-wave and infrared data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal, and appropriate circuitry can provide the data to I/O subsystem 602 and place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to the bus. Communication interface 618 provides a two-way data communication coupling to a network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a worldwide packet data communication network represented as Internet 628. A server computer 630 may be coupled to Internet 628. Server computer 630 broadly represents any computer, data center, virtual machine, or virtual computing instance with or without a hypervisor or computer executing a containerized program system such as DOCKER or KUBERNETES. Server computer 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server computer 630 may form elements of a distributed computing system that includes other computers, a processing cluster, a server farm, or other organizations of computers that cooperate to perform tasks or execute applications or services. Server computer 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 630 may comprise a web application server that hosts a presentation layer, application layer, and data storage layer such as a relational database system using a structured query language (SQL) or no SQL, an object store, a graph database, a flat-file system or other data storage.

Computer system 600 can send messages and receive data and instructions, including program code, through the network(s), network link 620 and communication interface 618. In the Internet example, a server computer 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:

receiving, from a client device, digital electronic copies of two or more electronic messages that are associated with one another as a message group and directed to a receiving electronic messaging account;

forming an in-memory object model of an electronic document, representing the two or more electronic messages and the message group;

evaluating the two or more electronic messages using one or more first trained machine learning models to identify and output one or more derived message elements as one or more topics that may require one or more responses from the receiving electronic messaging account, the one or more derived message elements comprising at least a list of one or more first text elements of the two or more electronic messages; and generating and transmitting, to the client device, presentation instructions that are formatted for rendering at the client device and to cause displaying the one or more derived message elements with an indication that the one or more derived message elements represent one or more topics that may require one or more responses from the receiving electronic messaging account, in a graphical user interface of the client device.

2. The computer-implemented method of claim 1, the two or more electronic messages being electronic mail messages that are related as a message thread.

3. The computer-implemented method of claim 1, the two or more electronic messages being displayed at the client device in an HTML document, the computer-implemented method further comprising:

obtaining access to a document object model (DOM) of the HTML document;

detecting a change in the DOM that is associated with the client device expanding a text display of one or more of the two or more electronic messages;

obtaining updated text of the two or more electronic messages from the DOM; and repeating the forming, evaluating, generating and transmitting based on the updated text.

4. The computer-implemented method of claim 1, the one or more derived message elements comprising one or more identifiers of one or more named entities, persons, or accounts specified in the two or more electronic messages and/or the message group.

5. The computer-implemented method of claim 1, the one or more derived message elements comprising at least a set of key takeaways from the two or more electronic messages and/or the message group.

6. The computer-implemented method of claim 1, the one or more derived message elements comprising at least a summary of the two or more electronic messages and/or the message group.

7. The computer-implemented method of claim 1, the one or more derived message elements comprising at least a set of keywords from the two or more electronic messages and/or the message group, the presentation instructions being formatted to cause displaying, at the client device, each keyword in the set of keywords using a keyword hyperlink, each keyword hyperlink being formatted to cause, when selected, displaying one or more second text elements of the two or more electronic messages, the one or more second text elements being semantically related to the keyword of the keyword hyperlink.

8. The computer-implemented method of claim 1, further comprising digitally storing, in a personal dictionary repository that is associated with a recipient account identifier that is based on the receiving account, the one or more derived message elements, and one or more encoded versions of one or more portions of the two or more electronic messages upon which the one or more derived message elements are based.

9. The computer-implemented method of claim 1, further comprising:

receiving a changed text from the client device, the changed text comprising at least a portion of a third electronic message that is associated with the two or more electronic messages;

evaluating the changed text using a second trained machine learning model to output a probability value specifying a probability that the changed text is a response to the one or more first text elements of the two or more electronic messages that require the one or more responses from the receiving account; and determining that the probability value is greater than a specified threshold value and, in response thereto, generating and transmitting, to the client device, updated presentation instructions that are formatted for rendering at the client device and to cause updating the graphical user interface of the client device to remove at least one of the one or more derived message elements.

10. The computer-implemented method of claim 1, further comprising:

receiving, from the client device, a feedback input specifying an approval or disapproval of the one or more derived message elements; and updating the one or more first trained machine learning models based on the feedback input.

11. One or more non-transitory computer-readable media storing one or more sequences of instructions, execution of which in a computer system causes the computer system to perform:

receiving, from a client device, digital electronic copies of two or more electronic messages that are associated with one another as a message group and directed to a receiving electronic messaging account;

forming an in-memory object model of an electronic document, representing the two or more electronic messages and the message group;

evaluating the two or more electronic messages using one or more first trained machine learning models to identify and output one or more derived message elements as one or more topics that may require one or more responses from the receiving electronic messaging account, the one or more derived message elements comprising at least a list of one or more first text elements of the two or more electronic messages; and generating and transmitting, to the client device, presentation instructions that are formatted for rendering at the client device and to cause displaying the one or more derived message elements with an indication that the one or more derived message elements represent one or more topics that may require one or more responses from the receiving electronic messaging account, in a graphical user interface of the client device.

12. The one or more non-transitory computer-readable media of claim 11, the two or more electronic messages being electronic mail messages that are related as a message thread.

13. The one or more non-transitory computer-readable media of claim 11, the two or more electronic messages being displayed at the client device in an HTML document, the sequences of instructions further configured to execute:

obtain access to a document object model (DOM) of the HTML document;

detect a change in the DOM that is associated with the client device expanding a text display of one or more of the two or more electronic messages;

obtain updated text of the two or more electronic messages from the DOM; and repeat the forming, evaluating, generating and transmitting based on the updated text.

14. The one or more non-transitory computer-readable media of claim 11, the one or more derived message elements comprising one or more identifiers of one or more named entities, persons, or accounts that are specified in the two or more electronic messages and/or the message group.

15. The one or more non-transitory computer-readable media of claim 11, the one or more derived message elements comprising at least a set of key takeaways from the two or more electronic messages and/or the message group.

16. The one or more non-transitory computer-readable media of claim 11, the one or more derived message elements comprising at least a summary of the two or more electronic messages and/or the message group.

17. The one or more non-transitory computer-readable media of claim 11, the one or more derived message elements comprising at least a set of keywords from the two or more electronic messages and/or the message group, the presentation instructions being formatted to cause displaying, at the client device, each keyword in the set of keywords using a keyword hyperlink, each keyword hyperlink being formatted to cause, when selected, displaying one or more second text elements of the two or more electronic messages, the one or more second text elements being semantically related to the keyword of the keyword hyperlink.

18. The one or more non-transitory computer-readable media of claim 11, further comprising digitally storing, in a personal dictionary repository that is associated with a recipient account identifier that is based on the receiving account, the one or more derived message elements and one or more encoded versions of one or more portions of the two or more electronic messages upon which the one or more derived message elements are based.

19. The one or more non-transitory computer-readable media of claim 11, the instructions further configured to execute instructions to:

receive changed text from the client device, the changed text comprising at least a portion of a third electronic message that is associated with the two or more electronic messages;

evaluate the changed text using a second trained machine learning model to output a probability value specifying a probability that the changed text is a response to the one or more first text elements of the two or more electronic messages that require the one or more responses from the receiving account; and determine that the probability value is greater than a specified threshold value and, in response thereto, generate and transmit, to the client device, updated presentation instructions that are formatted for rendering at the client device and to cause updating the graphical user interface of the client device to remove at least one of the derived message elements.

20. The one or more non-transitory computer-readable media of claim 11, the instructions further configured to:

receive, from the client device, a feedback input specifying an approval or disapproval of the one or more derived message elements; and update the one or more first trained machine learning models based on the feedback input.

21. The computer-implemented method of claim 1, further comprising:

generating and transmitting, to the client device, presentation instructions to cause displaying, in response to a selection on the client device of a selected topic from the one or more topics, an automatically generated reply message related to the selected topic and a control that when actuated by a user triggers sending of the automatically generated reply message, in an updated portion of the graphical user interface of the client device.

* * * * *